US011908105B2

(12) United States Patent
Tian et al.

(10) Patent No.: US 11,908,105 B2
(45) Date of Patent: Feb. 20, 2024

(54) IMAGE INPAINTING METHOD, APPARATUS AND DEVICE, AND STORAGE MEDIUM

(71) Applicant: Tencent Technology (Shenzhen) Company Limited, Shenzhen (CN)

(72) Inventors: Ye Tian, Shenzhen (CN); Zhibin Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 372 days.

(21) Appl. No.: 17/240,811

(22) Filed: Apr. 26, 2021

(65) Prior Publication Data

US 2021/0248721 A1 Aug. 12, 2021

Related U.S. Application Data

(63) Continuation of application No. PCT/CN2019/126843, filed on Dec. 20, 2019.

(30) Foreign Application Priority Data

Dec. 21, 2018 (CN) .......................... 201811573981.3

(51) Int. Cl.
*G06T 5/00* (2006.01)
*G06T 7/12* (2017.01)
(Continued)

(52) U.S. Cl.
CPC ................ *G06T 5/005* (2013.01); *G06T 5/50* (2013.01); *G06T 7/11* (2017.01); *G06T 7/12* (2017.01);
(Continued)

(58) Field of Classification Search
CPC ... G06T 5/006; G06T 5/50; G06T 7/11; G06T 2200/24; G06T 2207/20104;
(Continued)

(56) References Cited

U.S. PATENT DOCUMENTS 10,127,631 B1 * 11/2018 Duan ...................... G06T 11/60
10,839,575 B2 * 11/2020 Lin ......................... G06T 11/60
(Continued)

FOREIGN PATENT DOCUMENTS

CN 102117481 A 7/2011
CN 102169587 A 8/2011
(Continued)

OTHER PUBLICATIONS

Hao-jing Wang et al., "Efficient Image Inpainting Based on Bilinear Interpolation Downscaling", Changchun Institute of Optics, Fine Mechanics and Physics, Chinese Academy of Science, Changchun, China, May 31, 2010, 5 pgs.

(Continued)

*Primary Examiner* — Jin Cheng Wang
(74) *Attorney, Agent, or Firm* — Morgan, Lewis & Bockius LLP

(57) ABSTRACT

An image inpainting method is performed at a computing device, the method including: displaying an original image, and determining a to-be-inpainted first original region and a second original region different from the first original region in the original image in accordance with a user input; identifying a target pixel and a target pixel block comprising the target pixel in the first original region; obtaining a target search region from the second original region according to the target pixel and the target pixel block comprising the target pixel, an area of the target search region being smaller than an area of the second original region; and searching the target search region for a reference pixel block matching the target pixel block and updating the original image by inpainting the target pixel block according to the reference pixel block, and displaying the updated image.

20 Claims, 11 Drawing Sheets

(51) Int. Cl.
  *G06T 7/11* (2017.01)
  *G06T 5/50* (2006.01)
  *G06F 3/04842* (2022.01)

(52) U.S. Cl.
  CPC ...... *G06F 3/04842* (2013.01); *G06T 2200/24* (2013.01); *G06T 2207/20104* (2013.01)

(58) Field of Classification Search
  CPC . G06T 2207/10004; G06T 2207/20016; G06T 2207/20021; G06T 7/62; G06T 7/136; G06T 7/12; G06F 3/04842
  See application file for complete search history.

(56) References Cited

U.S. PATENT DOCUMENTS

| | | | |
|---|---|---|---|
| 2012/0045128 A1* | 2/2012 | Bae | G06T 5/005 382/173 |
| 2012/0086775 A1* | 4/2012 | Bae | H04N 13/261 348/46 |
| 2012/0141045 A1* | 6/2012 | Bae | G06T 5/005 382/275 |
| 2013/0155061 A1 | 6/2013 | Jahanshahi et al. | |
| 2013/0182184 A1* | 7/2013 | Senlet | H04N 5/272 348/586 |
| 2014/0301646 A1 | 10/2014 | Nagaoka | |
| 2016/0182920 A1* | 6/2016 | Yim | H04N 19/895 375/240.27 |
| 2017/0024864 A1* | 1/2017 | Karande | G06T 7/13 |
| 2018/0150940 A1* | 5/2018 | Reinhard | G06T 5/002 |
| 2018/0300937 A1* | 10/2018 | Chien | G06T 7/194 |
| 2019/0295227 A1* | 9/2019 | Wang | G06T 5/005 |
| 2020/0020075 A1* | 1/2020 | Khwaja | G06T 5/002 |
| 2021/0004940 A1* | 1/2021 | Qin | G06T 5/20 |
| 2021/0295477 A1* | 9/2021 | Zhai | G06T 7/0002 |

FOREIGN PATENT DOCUMENTS

| | | |
|---|---|---|
| CN | 102693534 A | 9/2012 |
| CN | 102800078 A | 11/2012 |
| CN | 103077499 A | 5/2013 |
| CN | 103325095 A | 9/2013 |
| CN | 103761708 A | 4/2014 |
| CN | 103955891 A | 7/2014 |
| CN | 103955906 A | 7/2014 |
| CN | 104282000 A | 1/2015 |
| CN | 104376535 A | 2/2015 |
| CN | 105528769 A | 4/2016 |
| CN | 105611154 A | 5/2016 |
| CN | 106296604 A | 1/2017 |
| CN | 106408534 A | 2/2017 |
| CN | 108053377 A | 5/2018 |
| KR | 101361075 B1 | 2/2014 |

OTHER PUBLICATIONS

Qiang Chen et al., "Image Inpainting with Improved Exemplar-Based Approach", Institute of Image Processing and Pattern Recognition, Department of Automation, Shanghai Jiao Tong University, Dec. 21, 2007, 2 pgs.

Tuo Xi et al., "A Section Based on Watershed Segmentation, Quick Image Repair Algorithm", Journal of Fudan University, vol. 56, No. 1, Feb. 28, 2017, 6 pgs.

Anupam Agrawal et al., "Fast and Enhanced Algorithm for Exemplar Based Image Inpainting", 2010 Fourth Pacific-Rim Symposium on Image and Video Technology, Dec. 31, 2010, 5 pgs., Retrieved from the Internet: https://www.researchgate.net/publication/224207478_Fast_and_Enhanced_Algorithm_for_Exemplar_Based_Image_Inpainting.

Lei Dai et al., "Improved Digital Image Restoration Algorithm Based on Criminisi", Journal of Digital Information Management, Oct. 31, 2016, 9 pgs., Retrieved from the Internet: https://www.dline.info/fpaper/jdim/v14i5/jdimv14i5_3.pdf.

Tencent Technology, WO, PCT/CN2019/126843, Mar. 19, 2020, 3 pgs.

Tencent Technology, IPRP, PCT/CN2019/126843, Jun. 16, 2021, 4 pgs.

Tencent Technology, ISR, PCT/CN2019/126843, dated Mar. 19, 2020, 2 pgs.

* cited by examiner

IMAGE INPAINTING METHOD, APPARATUS AND DEVICE, AND STORAGE MEDIUM

CROSS REFERENCE TO RELATED APPLICATIONS

This application is a continuation application of PCT Patent Application No. PCT/CN2019/126843, entitled "IMAGE RESTORATION METHOD, APPARATUS AND DEVICE, AND STORAGE MEDIUM" filed on Dec. 20, 2019, which claims priority to Chinese Patent Application No. 201811573981.3, filed with the State Intellectual Property Office of the People's Republic of China on Dec. 21, 2018, and entitled "IMAGE INPAINTING METHOD, APPARATUS AND DEVICE, AND STORAGE MEDIUM", all of which are incorporated herein by reference in their entirety.

FIELD OF THE TECHNOLOGY

Embodiments of this application relate to the field of image processing technologies, and in particular, to an image inpainting method, apparatus, and device, and a storage medium.

BACKGROUND OF THE DISCLOSURE

As photography functions increasingly improve and users have increasingly high requirements for photograph display effects, more and more users are keen to inpaint captured photographs, and remove text or objects in the photographs, thereby beautifying the photographs. Therefore, image inpainting becomes a common image processing method.

When image inpainting is required, a to-be-inpainted target image is obtained, the target image including a to-be-inpainted first original region and a second original region that does not need to be inpainted. A target pixel on a boundary between the first original region and the second original region and a target pixel block including the target pixel are determined according to the boundary. The second original region is searched for a reference pixel block matching the target pixel. The target pixel block is inpainted according to the reference pixel block. After the inpainting, a target pixel on a boundary between a region that is not inpainted currently and another region than the region is selected according to the boundary, and the foregoing inpainting steps continue to be performed for the selected target pixel, until the inpainting of the first original region is completed.

During the inpainting of the first original region, it is necessary to search the second original region that does not need to be inpainted for a reference pixel block matching the target pixel block. However, an area of the second original region is relatively large, causing that an excessively long time needs to be consumed in the search process, and the search speed is slow.

SUMMARY

An image inpainting method, apparatus and device, and a storage medium are provided according to embodiments of this application.

An image inpainting method is performed by a computing device, the method including:

displaying an original image, and determining a to-be-inpainted first original region and a second original region different from the first original region in the original image in accordance with a user input;

identifying a target pixel and a target pixel block comprising the target pixel in the first original region;

obtaining a target search region from the second original region according to the target pixel and the target pixel block including the target pixel, an area of the target search region being smaller than an area of the second original region; and searching the target search region for a reference pixel block matching the target pixel block and updating the original image by inpainting the target pixel block according to the reference pixel block, and displaying the updated image.

An image inpainting apparatus is provided, including:

a display module, configured to display an original image;

a determining module, configured to determine a to-be-inpainted first original region and a second original region different from the first original region in the original image in accordance with a user input and identify a target pixel and a target pixel block comprising the target pixel in the first original region;

a region obtaining module, configured to obtain a target search region from the second original region according to the target pixel and the target pixel block including the target pixel, an area of the target search region being smaller than an area of the second original region;

a search module, configured to search the target search region for a reference pixel block matching the target pixel block; and an inpainting module, configured to update the original image by inpainting the target pixel block according to the reference pixel block, and display the updated image.

A computing device for inpainting an image is provided, including a memory and a processor, the memory storing computer-readable instructions, the computer-readable instructions, when executed by the processor, causing the processor to perform the operations of the foregoing image inpainting method.

A non-transitory computer-readable storage medium storing computer-readable instructions is provided, the computer-readable instructions, when executed by one or more processors of a computing device, causing the computing device to perform the operations of the foregoing image inpainting method.

Details of one or more embodiments of this application are provided in the accompanying drawings and descriptions below. Other features, objectives, and advantages of this application become apparent from the specification, the accompanying drawings, and the claims.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from the accompanying drawings without creative efforts.

DESCRIPTION OF EMBODIMENTS

Figure 1:
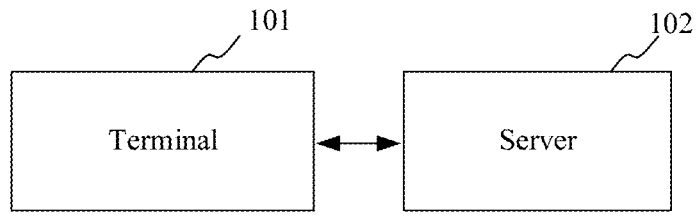
FIG. 1 is a schematic diagram of an implementation environment according to an embodiment of this application.

To make objectives, technical solutions, and advantages of the embodiments of this application clearer, the following further describes in detail implementations of this application with reference to the accompanying drawings. It is to be understood that the specific embodiments described herein are used only for describing this application, and are not intended to limit this application. FIG. 1 is a schematic diagram of an implementation environment according to an embodiment of this application. Referring to FIG. 1, the implementation environment includes a terminal 101.

The terminal 101 may be one of a plurality of types of devices such as a mobile phone, a computer, a tablet computer, and a smart television. The terminal 101 has an image inpainting function. After obtaining a target image, the terminal can inpaint a specific region in the target image.

In a possible implementation, the implementation environment may further include a server 102. The terminal 101 and the server 102 are connected through a network. The server 102 may be one server, a server cluster including several servers, or a cloud computing service center.

After obtaining the target image, the terminal 101 transmits the target image to the server 102. The server 102 receives the target image, in paints the specific region in the target image, and transmits an inpainted image to the terminal 101. In this case, the terminal 101 receives the inpainted image, and displays the inpainted image to a user.

This embodiment of the present disclosure is applicable to any scenario of inpainting a specific region in a specific image.

For example, a user takes a portrait photograph. However, in addition to the user, there are other strangers in the photograph. In this case, a region in which the strangers are located in the photograph may be used as a to-be-inpainted region. The region is inpainted by using a method provided in the embodiments of this application, to obtain a photograph that does not include the strangers.

In another example, a user photographs a video of food. However, in addition to the food, the video further includes tableware. In this case, a region in which the tableware is located in the video may be used as a to-be-inpainted region. The region in each video frame of the video is inpainted by using a method provided in the embodiments of this application, to obtain a video that does not include the tableware.

Figure 2:
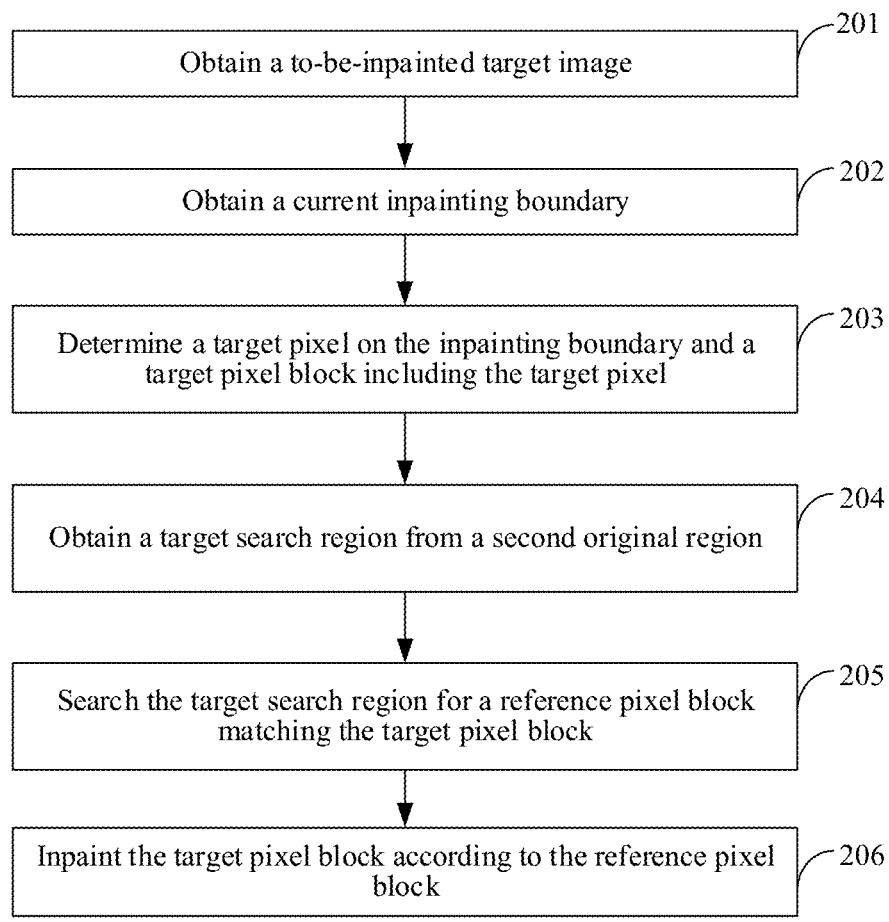
FIG. 2 is a flowchart of an image inpainting method according to an embodiment of this application.

FIG. 2 is a flowchart of an image inpainting method according to an embodiment of the present disclosure. This embodiment of the present disclosure is performed by a device for inpainting an image, specifically an image inpainting device. The image inpainting device is the terminal 101 or the server 102 in the foregoing embodiment shown in FIG. 1. Referring to FIG. 2, the method includes the following steps:

201. Obtain a to-be-inpainted target image.

This embodiment of this application is applicable to a scenario of image inpainting. For any obtained original image, a to-be-inpainted target image is obtained by determining a to-be-inpainted region in the original image, the target image including a to-be-inpainted first original region and a second original region except (or different from) the first original region.

A difference between the target image and the original image is that, in the original image, a pixel value of each pixel in the first original region and the second original region is an original pixel value. However, in the target image, a pixel value of each pixel in the second original region is an original pixel value, while a pixel value of each pixel in the first original region is a specified pixel value, so that the first original region displays a color corresponding to the specified pixel value.

The specified pixel value may be a pixel value of a lighter color, for example, a pixel value of a white color. The pixel value of the each pixel in the first original region is modified to the specified pixel value, so that the first original region in the target image is displayed in a specified color, thereby avoiding interference caused by an original color of the first original region during inpainting of the first original region.

In a possible implementation, the first original region may be determined by a user through a selection operation. That is, the image inpainting device displays the original image, and the user triggers the selection operation in the original image. When detecting the selection operation, the image inpainting device determines a region corresponding to the selection operation as the first original region, determines an unselected region as the second original region, modifies the pixel value of the each pixel in the first original region to the specified pixel value, and keeps the pixel value of the each pixel in the second original region unchanged, to obtain a to-be-inpainted target image. The selection operation may be a slide operation, a click operation, a touch and hold operation, or the like. For example, the user may trigger the slide operation in the original image, to determine a slide region as the first original region. Alternatively, the user clicks on any position in the original image, to determine a region of a preset size with the position as a center as the first original region. Alternatively, the user touches and holds any position in the original image, to determine a region of a preset size with the position as an upper left corner as the first original region.

For example, the image inpainting device displays an image management interface. The image management interface includes an image invoking option. When the user performs a confirmation operation on the image invoking option, an image invoking instruction may be triggered. After receiving the image invoking instruction, the image inpainting device invokes an image database, to obtain an original image selected by the user from the image database. The image inpainting device displays the original image on the image management interface, and the user performs the selection operation in the original image. When detecting the selection operation, the image inpainting device determines a region corresponding to the selection operation as the first original region, determines a region except (or different from) the first original region in the original image as the second original region, modifies the pixel values of the pixels in the first original region to the specified pixel values, and keeps the pixel values of the pixels in the second original region unchanged, to obtain a target image. In this case, the target image may be displayed for the user to view, or the target image may not be displayed. Subsequently, the original image is directly switched to the inpainted image for display.

In another possible implementation, to obtain the target image while retaining the original image, the image inpainting device displays the original image, determines, according to a detected selection operation, a region corresponding to the selection operation, and creates a labeled image according to the region corresponding to the selection operation. A size of the labeled image is equal to a size of the original image. In addition, a pixel value of each pixel in the region corresponding to the selection operation in the labeled image is a first specified pixel value, while a pixel value of each pixel in the unselected region is a second specified pixel value. The image inpainting device obtains a boundary between the two regions in the labeled image, performs region division on the original image according to a position of the boundary, determines a first original region and a second original region in the original image, modifies the pixel values of the pixels in the first original region to third specified pixel values, and keeps the pixel values of the pixels in the second original region unchanged, to obtain a target image.

Figure 3:
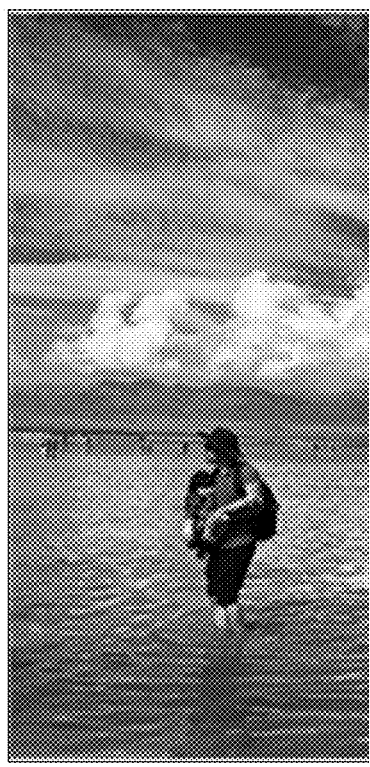
FIG. 3 is a schematic diagram of an original image according to an embodiment of this application.
Figure 4:
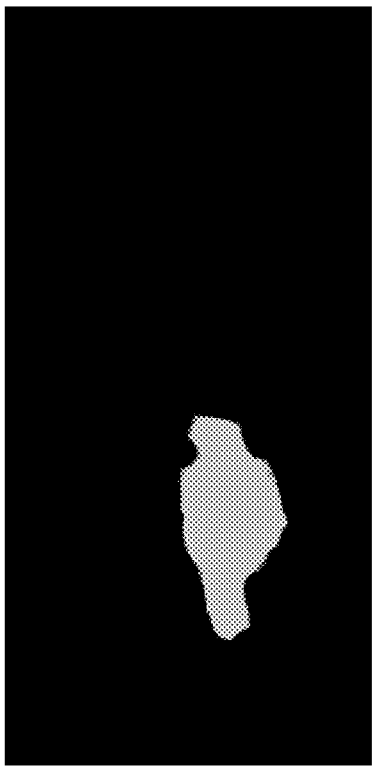
FIG. 4 is a schematic diagram of a labeled image according to an embodiment of this application.

For example, FIG. 3 is the original image, and the user performs the slide operation on a region in which a character is located in the original image. If determining, according to the slide operation of the user, that a region selected by the user is the region in which the character is located, the image inpainting device creates a mask image shown in FIG. 4, further determines a first original region and a second original region in the original image according to a position of a boundary between the two regions in the mask image, and modifies the pixel values of the pixels in the first original region, to obtain a target image shown in FIG. 5.

202. Obtain a current inpainting boundary.

Figure 6:
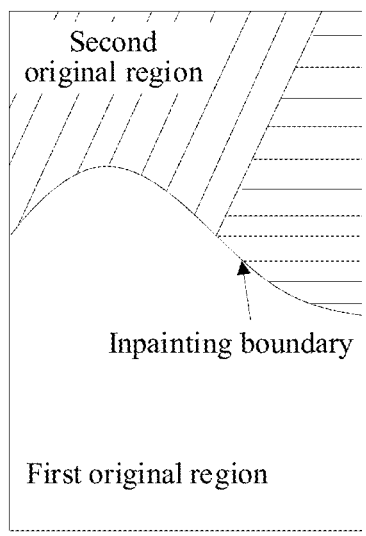
FIG. 6 is a schematic diagram of an inpainting boundary according to an embodiment of this application.

The inpainting boundary is a boundary between a region that is not inpainted currently and another region than the region. This includes, but is not limited to, the following two cases:

A first case: After the image inpainting device obtains the target image, before the image inpainting device starts to inpaint the target image, as shown in FIG. 6 (different lines in FIG. 6 represent different colors), the region that is not inpainted currently is the first original region, and the inpainting boundary is the boundary between the first original region and the second original region.

Figure 7:
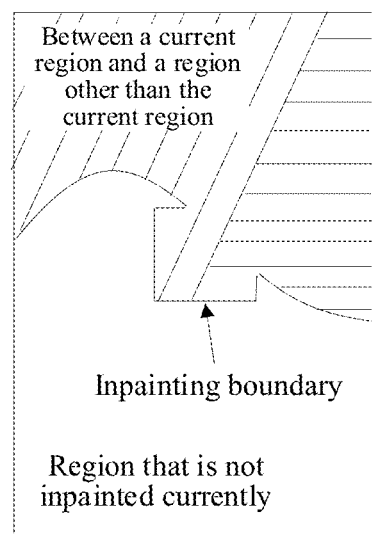
FIG. 7 is a schematic diagram of an inpainting boundary according to an embodiment of this application.

A second case: After the image inpainting device has inpainted a part of the first original region, as shown in FIG. 7 (different lines in FIG. 7 represent different colors), the region that is not inpainted currently is a remaining region that is not inpainted except the inpainted region in the first original region, while a region that does not need to be inpainted currently is the inpainted region in the second original region and the first original region, and the inpainting boundary is a boundary between the region that is not inpainted currently and another region than the region.

203. Determine a target pixel on the inpainting boundary and a target pixel block including the target pixel.

After obtaining the current inpainting boundary, the image inpainting device determines a specific pixel on the inpainting boundary as the target pixel, and determines a pixel block including the target pixel as a to-be-inpainted target pixel block.

In a possible implementation, a pixel may be randomly selected from the inpainting boundary as the target pixel; or inpainting priorities of a plurality of pixels on the inpainting boundary may be obtained, and a pixel with the highest inpainting priority is determined as the target pixel.

For any pixel on the inpainting boundary, the inpainting priority may be obtained by using the following formula:

$$P(p) = C(p) * D(p) \tag{1}$$

$$C(p) = \frac{\sum_{q \in \psi_p \cap \Phi} C(q)}{|\psi_p|} \tag{2}$$

$$D(p) = \frac{|\nabla I_p^\perp \cdot n_p|}{\alpha} \tag{3}$$

Figure 8:
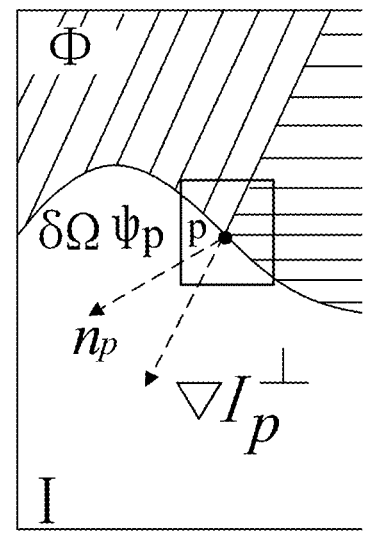
FIG. 8 is a schematic diagram of a pixel on an inpainting boundary according to an embodiment of this application.

As shown in FIG. 8 (different lines in FIG. 8 represent different colors), I represents the target image, Ω represents the region that is not inpainted currently, and Φ represents the another region than the region, that is, Φ=I−Ω. δΩ represents the inpainting boundary, $\psi_p$ represents a pixel block including a pixel p, $\psi_p \cap \Omega$ represents a to-be-inpainted region in the pixel block $\psi_p$, and $\psi_p \cap \Phi$ represents another region than the to-be-inpainted region in the pixel block $\psi_p$. P(p) represents an inpainting priority of the pixel p, C(p) represents a confidence of the pixel p, and D(p) represents a data item of the pixel p. C(q) is a confidence of the pixel q, and an initial value of C(q) is 1. $|\psi_p|$ represents an area of the pixel block $\psi_p$, $\nabla I_p^\perp$ represents an orthogonal vector of a gradient vector of the pixel p, $n_p$ is a unit vector with the pixel p as a vertex, and α represents a normalization factor. When the target image is a grayscale image, α=255.

Alternatively, for any pixel on the inpainting boundary, the inpainting priority may be obtained by using any one of the following formulas:

$$P(p)=C(p)+D(p) \tag{4}$$

$$P(p)=aC(p)+bD(p) \tag{5}$$

$$P(p)=aR_c(p)+bD(p), R_c(p)=(1-w)*C(p)+w \tag{6}$$

P(p) represents an inpainting priority of the pixel p, C(p) represents a confidence of the pixel p, D(p) represents a data item of the pixel p, a and b each represent a weight, and a+b=1. w is a fixed constant between 0 and 1.

In another possible implementation, the determining the pixel block including the target pixel as the to-be-inpainted target pixel block includes: obtaining a pixel block with the target pixel as a center and a size as a preset size as the target pixel block, or obtaining a pixel block with the target pixel as a vertex and a size as a preset size and intersecting with both the first original region and the second original region as the target pixel block. The preset size is 9×9, 15×15 or another size.

204. Obtain a target search region from the second original region.

The image inpainting device obtains the target search region from the second original region, to search the target search region for a pixel block matching the target pixel block. The target search region belongs to the second original region, and an area of the target search region is smaller than an area of the second original region. The area of the region refers to a total quantity of pixels included in the region.

For a shape of the target search region, the shape may be any shape, for example, a circle, a rectangle, or an irregular figure. For a manner of obtaining the target search region, the image inpainting device may use an intersection region between a neighboring region of the target pixel block and the second original region as the target search region. The neighboring region is a region with the target pixel block as a center. A size or shape of the neighboring region may be randomly set.

Compared with searching in the second original region, searching in a target search region with a relatively small area reduces a search region, shortens a search duration, and improves a search speed.

In a possible implementation, the image inpainting device obtains a circular region with the target pixel as a center, and determines an intersection region between the circular region and the second original region as the target search region. A radius of the circular region may be a fixed value.

In another possible implementation, the radius of the circular region is positively correlated to the area of the target search region, while the area of the target search region is positively correlated to a duration of the search pixel block in the target search region. Therefore, the radius of the circular region affects the search duration, and further affects the efficiency of image inpainting.

Table 1 is a diagram of a relationship between a radius of a circular region and a search duration provided in the embodiments of this application. It can be learned from Table 1 that, a smaller radius of the circular region indicates a shorter search duration.

TABLE 1

| Radius of circular region (pixel) | Search duration (second) |
|---|---|
| 200 | 47.81 |
| 150 | 37.05 |
| 120 | 25 |

Therefore, the obtaining the target search region according to the radius of the circular region may include the following step 2041 to step 2043:

2041. Obtain a circular region with the target pixel as a center and a search distance as a radius.

The search distance is equal to a product of an area of the first original region and a preset coefficient, and the preset coefficient is greater than 0. For example, the preset coefficient may be 0.5, 0.45, or 0.4, or may be another value greater than 0.

For example, when the target pixel is p, the area of the first original region is S, and the preset coefficient is 0.45, the image inpainting device obtains a circular region with p as a center and a radius of 0.45 S.

After obtaining the circular region, the image inpainting device further determines whether the circular region intersects with the second original region, and performs the following step 2042 or step 2043 according to a determining result:

2042. Determine the intersection region between the circular region and the second original region as the target search region when the circular region intersects with the second original region.

The intersection region between the circular region and the second original region is directly determined as the target search region when the circular region intersects with the second original region. In this way, it can be not only ensured that searching may be performed within a region that is adjacent to the target pixel and belongs to the second original region, but also can be ensured that the area of the target search region is not excessively large, and the search duration is shortened as much as possible.

2043. Expand the search distance when the circular region does not intersect with the second original region, obtain a circular region with the target pixel as a center and the expanded search distance as a radius, until the currently obtained circular region intersects with the second original region, and determine an intersection region between the currently obtained circular region and the second original region as the target search region.

For example, the current search distance is a first search distance. The search distance is expanded when the circular region with the target pixel as a center and the first search distance as a radius does not intersect with the second original region, to obtain a second search distance, a circular region with the target pixel as a center and the second search distance as a radius is obtained, and whether the circular region intersects with the second original region is further determined. If the currently obtained circular region still does not intersect with the second original region, the search distance is further expanded, to obtain a third search distance, and the process is repeated, until the currently obtained circular region intersects with the second original region. The intersection region between the currently obtained circular region and the second original region is determined as the target search region.

When being expanded, the search distance may be expanded according to a preset step. The preset step may be 5 pixels, or 9 pixels, or may be another quantity of pixels; or a manner of expanding the search distance by a preset multiple may be used. The preset multiple may be 0.5, 1, or another multiple.

For example, the target pixel is p, the first search distance is R, and the search distance is expanded to 2R when a circular region with p as a center and R as a radius does not intersect with the second original region. An intersection region is determined as the target search region when a circular region with p as a center and 2R as a radius intersects with the second original region. Alternatively, the search distance is expanded to 3R when the circular region with p as the center and 2R as the radius does not intersect with the second original region, and the process is repeated, until the currently obtained circular region intersects with the second original region. The intersection region between the currently obtained circular region and the second original region is determined as the target search region.

When the image inpainting device inpaints the target image for the first time, the determined target pixel is located on the boundary between the first original region and the second original region. Therefore, the obtained circular region with the target pixel as the center and the search distance as the radius definitely intersects with the second original region. In this case, the intersection region between the circular region and the second original region may be determined as the target search region by using the foregoing step 2042.

As the first original region is gradually inpainted, the inpainting boundary gradually moves toward an inside of the first original region. The image inpainting device gradually selects the target pixel in a direction of moving toward the inside of the first original region, causing that a distance between the target pixel and the boundary between the first original region and the second original region gradually becomes large. When the distance is excessively large, it may be caused that the circular region in which the target pixel is located does not intersect with the second original region, and the target search region belonging to the second original region cannot be obtained. In this case, the circular region may be reconstructed in a manner of expanding the search distance by using the foregoing step 2043, to obtain the target search region belonging to the second original region.

In the foregoing manner of obtaining the target search region, it can be ensured that the target search region belongs to the second original region, and may include image information in the original image. The pixel block found in the target search region may be used for inpainting, and the target search region with the target pixel as the center can ensure that the pixel block is searched near the target pixel block, thereby improving the accuracy, and improving the inpainting effect.

In a possible implementation, the pixel value of the each pixel in the second original region may be obtained, and the second original region is divided into a plurality of regions according to different pixel values, so that the pixel values of the pixels within each region belong to the same pixel range. When the target pixel block is obtained, at least one pixel value included in the target pixel block is determined according to the pixel value of the each pixel in the target pixel block. In this case, the target search region is obtained from only the second original region and a region corresponding to the at least one pixel value, without considering another region in the second original region again.

A color division may be directly performed on the second original region, or after the second original region is converted into a grayscale image, a grayscale division is performed on the second original region.

205. Search the target search region for a reference pixel block matching the target pixel block.

In a possible implementation, the process of searching a reference pixel block may include the following step 2051 and step 2052:

2051. Obtain, from the target search region, a plurality of pixel blocks having the same size as the target pixel block.

After the image inpainting device obtains the target pixel block, a search window having the same size as the target pixel block may be set. By moving the search window a plurality of times in the target search region, each time a position of the search window is determined, a pixel block within the search window is obtained. Then, the search window moves to a next position, and a pixel block within the search window continues to be obtained, until the movement of the search window is completed in the target search region. The plurality of pixel blocks having the same size as the target pixel block are obtained.

A movement step of the search window may be 1, 2, 3 or any value. When the movement step of the search window is 1, it represents that each time the search window moves, the search window moves by one pixel in both a horizontal direction and a vertical direction. Table 2 is a diagram of a relationship between a movement step of a search window and a search duration provided in the embodiments of this application. It can be learned from Table 2 that, in the same region, a longer movement step of the search window indicates a shorter search duration.

TABLE 2

| Step | Search duration (second) |
| --- | --- |
| Step = 1 | 52.95 |
| Step = 2 | 13.53 |
| Step = 3 | 6.26 |
| Step = 4 | 3.74 |

However, when the movement step of the search window is set excessively large, the search window may be caused to fail to find a pixel block matching the target pixel block. Therefore, comprehensively considering requirements of the search duration and the found matched pixel blocks, an appropriate movement step may be set by using the following formula: $L=0.03*\sqrt{S_1}$. L represents the movement step, and $S_1$ represents the area of the first original region.

2052. Obtain similarities between the plurality of pixel blocks and the target pixel block, and determine, in the plurality of pixel blocks, a pixel block with the highest similarity to the target pixel block as the reference pixel block.

The similarity between any two pixel blocks represents a similarity between the two pixel blocks. A relatively high similarity represents that the two pixel blocks are more similar.

After obtaining the plurality of pixel blocks, the image inpainting device obtains a similarity between each of the plurality of pixel blocks and the target pixel block, determines, in the plurality of pixel blocks, a pixel block with the highest similarity to the target pixel block as the reference pixel block, and inpaints the target pixel block by using the pixel block most similar to the target pixel block, thereby improving the inpainting effect.

The similarity may be represented by a Euclidean distance. A larger Euclidean distance indicates a lower similarity. In this case, Euclidean distances between the plurality of pixel blocks and the target pixel block are obtained, and a pixel block with the minimum Euclidean distance to the target pixel block in the plurality of pixel blocks is determined as the reference pixel block. The Euclidean distance may be an L1 Euclidean distance, an L2 Euclidean distance, or an L3 Euclidean distance.

A calculation manner of the Euclidean distance is related to a color space of the target image color image. The color space may be an RGB color space, or an LAB color space, or may be a color space in another form.

In a possible implementation, an example in which a pixel block $\psi_{\tilde{p}}$ and a pixel block $\psi_q$ is used. When the color space of the pixel block is the RGB color space, L1 Euclidean distances between the pixel block pi and the pixel block $\psi_q$ are separately obtained by using the following formula:

$$d(\psi_{\tilde{p}},\psi_q)=\Sigma\{|R_{\tilde{p}}(u)-R_q(v)|+|G_{\tilde{p}}(u)-G_q(v)|+|B_{\tilde{p}}(u)-B_q(v)|\} \quad (7).$$

$R_{\tilde{p}}(u)$, $G_{\tilde{p}}(u)$, and $B_{\tilde{p}}(u)$ represent a red component pixel value, a green component pixel value, and a blue component pixel value respectively at a pixel u in the pixel block $\psi_{\tilde{p}}$, and $R_q(v)$, $G_q(v)$, and $B_q(v)$ represent a red component pixel value, a green component pixel value, and a blue component pixel value respectively at a pixel v corresponding to the pixel u in the pixel block $\psi_q$.

A calculation manner of the L2 Euclidean distance and the L3 Euclidean distance may be similar to the foregoing calculation manner of the L1 Euclidean distance. Details are not described herein again.

The foregoing step 2051 and step 2052 are described only after the plurality of pixel blocks having the same size as the target pixel block are obtained, and the similarities between the pixel blocks and the target pixel block are then separately obtained. In another possible implementation, after the pixel blocks having the same size as the target pixel block are obtained each time, the similarities between the pixel blocks and the target pixel block are obtained.

In another possible implementation, the process of searching a reference pixel block may further include step 2053 and step 2054:

2053. Obtain, from the target search region, a plurality of pixel blocks matching the target pixel block.

In this embodiment of this application, the image inpainting device obtains the similarity between the each pixel block and the target pixel block from the target search region, and sorts the similarities in descending order, to obtain a plurality of pixel blocks with higher similarities, or to obtain a plurality of pixel blocks with similarities not less than a preset threshold.

The preset threshold may be generally determined by the similarity between two pixel blocks that match each other. In addition, the manner of obtaining the similarities is the same as the manner of obtaining the similarities in the foregoing step 2052. Details are not described herein again.

For example, the L1 Euclidean distances between the target pixel block and the found pixel blocks are calculated, and the L1 Euclidean distances are sorted in ascending order, to obtain a plurality of pixel blocks with relatively small L1 Euclidean distances, or to obtain a plurality of pixel blocks with L1 Euclidean distances less than a preset threshold.

2054. Perform a weighted fusion on the plurality of pixel blocks according to a similarity between each of the plurality of pixel blocks and the target pixel block, to obtain the reference pixel block.

The image inpainting device obtains a weight of the each pixel block according to the similarity between each of the plurality of pixel blocks and the target pixel block, determines pixels having the same position as that in the plurality of pixel blocks, performs a weighted fusion on the determined pixel values of the plurality of pixels according to weights of the pixel blocks, and uses the fused pixel value as a pixel value of a pixel on the same position in the reference pixel block. A pixel value of a pixel on each position in the reference pixel block may be obtained by using the foregoing manner, to obtain the reference pixel block.

The weight of the each pixel block may be determined by the similarity between the each pixel block and the target pixel block, and the similarity is positively correlated to the weight. In this case, the weight corresponding to the pixel block may be obtained by obtaining the similarity between the each pixel block and the target pixel block. The similarity may be represented in percentage, or may be represented in decimal, or may be represented in another manner.

In a possible implementation, the similarity may be represented by using the L1 Euclidean distance. After the plurality of pixel blocks with relatively small L1 Euclidean distances are obtained, a reciprocal of the L1 Euclidean distance between the each pixel block and the target pixel block is used as the weight of the pixel block, so that when an L1 Euclidean distance between a specific pixel block and the target pixel block is relatively small, a weight of the pixel block is relatively large.

206. Inpaint the target pixel block according to the reference pixel block.

The inpainting the target pixel block according to the reference pixel block includes any one of the following steps:

2061. Determine, for a first pixel in the target pixel block, a pixel value of a pixel in the reference pixel block corresponding to the first pixel as a pixel value after inpainting of the first pixel.

When a position of the first pixel in the target pixel block is the same as a position of another pixel in the reference pixel block, the first pixel and the another pixel are corresponding pixels.

When inpainting the target pixel block according to the reference pixel block, the image inpainting device obtains the first pixel in the target pixel block and the position of the first pixel in the target pixel block, obtains a pixel value of the pixel at the corresponding position in the reference pixel block, and determines the pixel value as the pixel value after inpainting of the first pixel. Then, for other pixels in the target pixel block, the foregoing manner may be also used for inpainting, to complete the inpainting of the target pixel block.

2062. Fuse, for a first pixel in the target pixel block, a pixel value of a pixel in the reference pixel block corresponding to the first pixel with a pixel value of the first pixel, and determine a pixel value obtained through the fusion as a pixel value after inpainting of the first pixel.

The fusion manner may alternatively be the weighted fusion. By setting weights of the target pixel block and the reference pixel block, the weighted fusion is performed on the pixel value of the pixel in the reference pixel block corresponding to the first pixel and the pixel value of the first pixel according to the weights of the pixel blocks.

A sum of the weights of the target pixel block and the reference pixel block is 1. For example, the weights of the target pixel block and the reference pixel block are set to 0.4 and 0.6, or 0.65 and 0.35, or 0.5 and 0.5 respectively, or the weights of the target pixel block and the reference pixel block may be determined by using another manner.

In a possible implementation, if the first pixel is located on a region that is not inpainted in the target pixel block, the pixel value of the first pixel is not considered, and the pixel value of the pixel in the reference pixel block corresponding to the first pixel is determined as the pixel value after inpainting of the first pixel. If the first pixel is located on the another region than the region that is not inpainted in the target pixel block, the pixel value of the pixel in the reference pixel block corresponding to the first pixel is fused with the pixel value of the first pixel, and a pixel value obtained through the fusion is determined as the pixel value after inpainting of the first pixel.

In another possible implementation, the region that is not inpainted and the another region are inpainted by using the foregoing manner, causing that sawteeth are generated on the boundary between the two inpainted regions, thereby affecting the image display effect. Therefore, before the inpainting, a smooth boundary may be first selected from the target pixel block, and the target pixel block is divided into two specified regions by using the boundary. If the first pixel is located on a specified region with a relatively large area of an intersection region with the region that is not inpainted, the pixel value of the first pixel is not considered, and the pixel value of the pixel in the reference pixel block corresponding to the first pixel is determined as the pixel value after inpainting of the first pixel. If the first pixel is located on another specified region, the pixel value of the pixel in the reference pixel block corresponding to the first pixel is fused with the pixel value of the first pixel, and the pixel value obtained after the fusion is determined as the pixel value after inpainting of the first pixel. The manner of selecting the smooth boundary may be a dynamic planning manner, or may be another manner.

In this way, after the target pixel block is inpainted, the target pixel block and a surrounding region are smoothly transited visually, thereby avoiding obvious artificial inpainting traces in the inpainting region.

After the inpainting of the current target pixel block is completed, the to-be-inpainted region changes. As a result, the inpainting boundary also changes. In this case, the foregoing step 202 to step 206 are re-performed according to the changed inpainting boundary, and the inpainting continues to be performed, until the inpainting of the first original region is completed, to obtain the inpainted image. In this case, the inpainted image may be displayed for the user to view, and the inpainted image is saved in a gallery according to a save operation triggered by the user; or the inpainted image may be displayed for the user to view, and the inpainted image may be automatically saved in a gallery.

Figure 5:
FIG. 5 is a schematic diagram of a target image according to an embodiment of this application.
Figure 9:
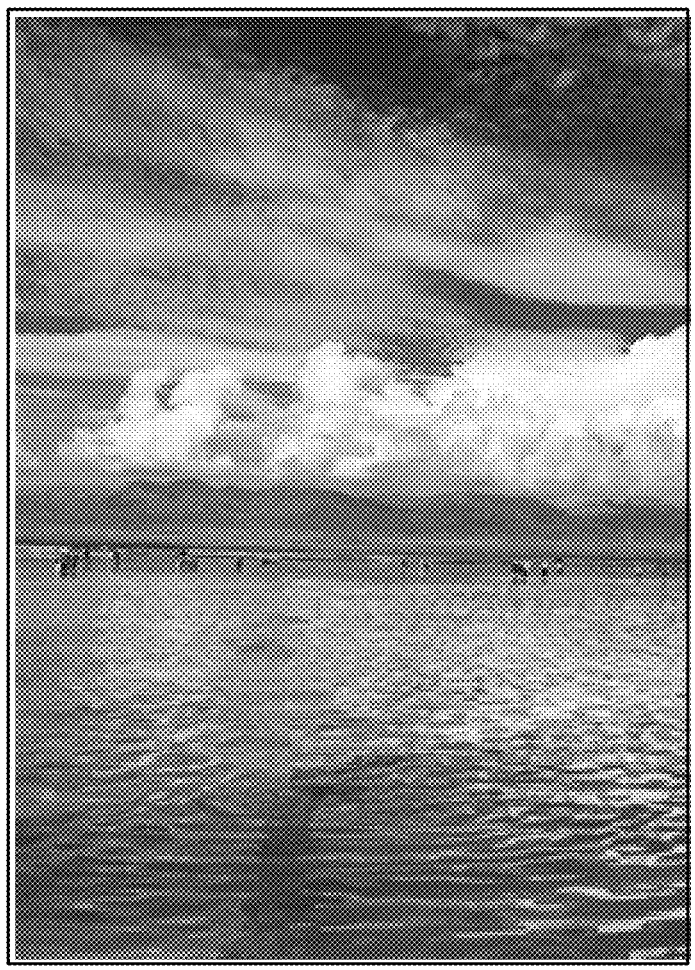
FIG. 9 is a schematic diagram of an inpainted image according to an embodiment of this application.

For example, the original image is the image shown in FIG. 3, and is inpainted according to the target image shown in FIG. 5, to obtain the image shown in FIG. 9.

In addition, when the first original region is determined by detecting the selection operation of the user, in the process of performing the selection operation by the user, the region corresponding to the selection operation is gradually increased. In this case, the gradually increasing region is inpainted by performing the foregoing step 202 to step 206. In addition, a dynamic effect that the pixel value of the each pixel in the region corresponding to the selection operation is switched from an original pixel value to a pixel value after inpainting may be further displayed, until the selection operation stops, and the inpainting of the each pixel in the first original region is completed already. In this case, the image inpainting device displays the inpainted image. A dynamic effect of the inpainting process can be displayed in the selection process of the user, and a dynamic inpainting interface is displayed for the user, thereby improving the display effect, and enhancing interests.

In the method provided in the embodiments of this application, a to-be-inpainted target image is obtained, the target image including a to-be-inpainted first original region and a second original region except (or different from) the first original region; an inpainting boundary between a region that is not inpainted currently and another region than the region is obtained, and a target pixel on the inpainting boundary and a target pixel block including the target pixel are determined; a target search region is obtained from the second original region, and the target search region is searched for a reference pixel block matching the target pixel block; and the target pixel block is inpainted according to the reference pixel block. Because an area of the target search region is smaller than an area of the second original region, compared with searching in the second original region, searching in a target search region with a relatively small area reduces the search region, shortens the search duration, and improves the search speed.

In addition, by obtaining a target search region with the target pixel as a center from the second original region, it can be not only ensured that the target search region includes image information in the original image, and the pixel block found in the target search region may be used for inpainting, but also can be ensured that the pixel block is searched near the target pixel block, thereby improving the accuracy, and improving the inpainting effect.

In addition, for the pixel of the target pixel block, the pixel value of the pixel is further fused with the pixel value of the pixel in the reference pixel block corresponding to the pixel, and a pixel value obtained through the fusion is determined as a pixel value after inpainting of the pixel, so that the target pixel block and the surrounding region are smoothly transited visually, thereby avoiding obvious artificial inpainting traces in the inpainting region.

Figure 10:
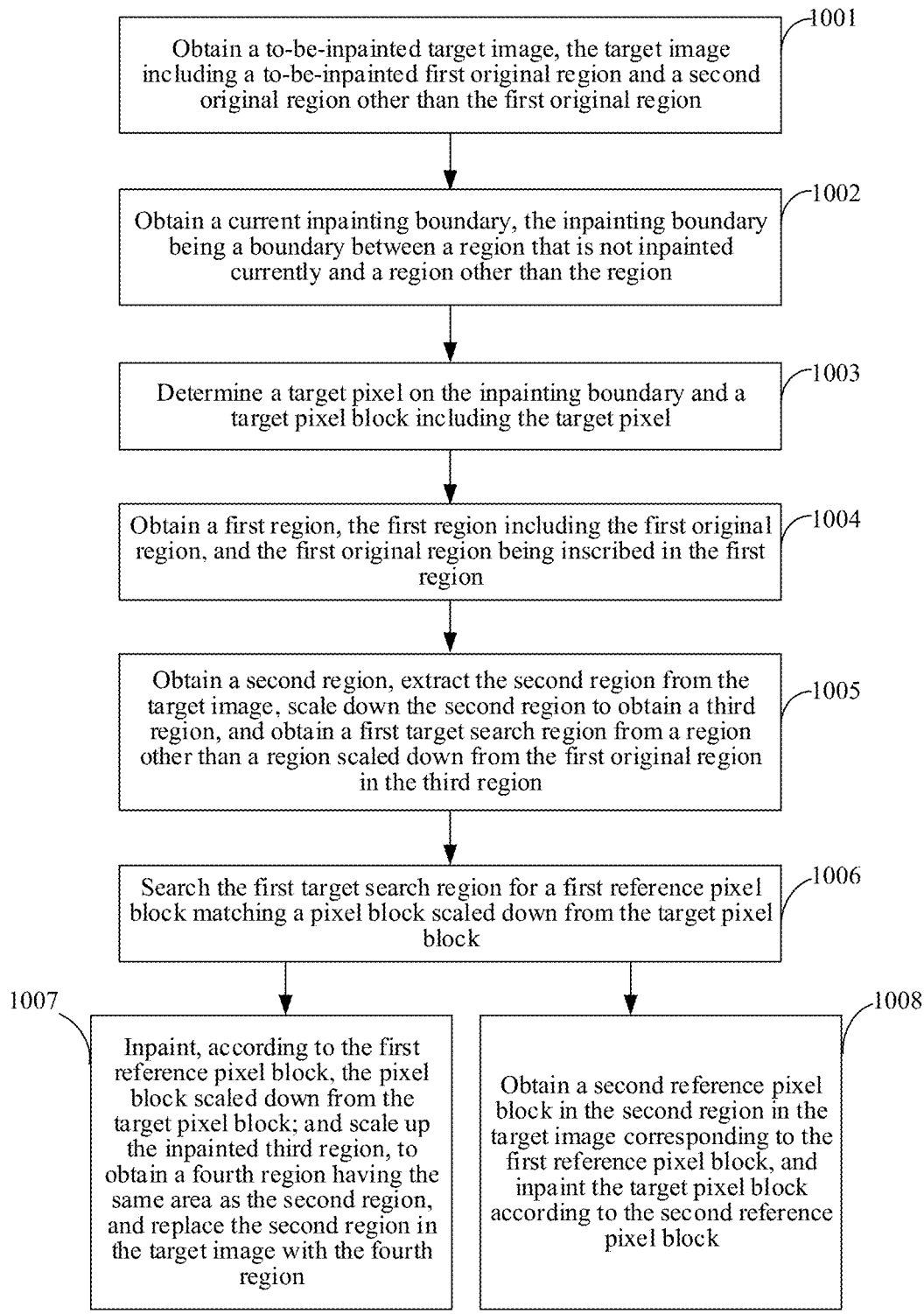
FIG. 10 is a flowchart of an image inpainting method according to an embodiment of this application.

Based on the foregoing method embodiments, another image inpainting method is further provided. FIG. 10 is a flowchart of an image inpainting method according to an embodiment of this application. Referring to FIG. 10, the method includes the following steps:

1001. Obtain a to-be-inpainted target image, the target image including a to-be-inpainted first original region and a second original region except (or different from) the first original region.

1002. Obtain a current inpainting boundary, the inpainting boundary being a boundary between a region that is not inpainted currently and another region than the region.

1003. Determine a target pixel on the inpainting boundary and a target pixel block including the target pixel.

Step 1001 to step 1003 are the same as step 201 to step 203.

1004. Obtain a first region, the first region including the first original region, and the first original region being inscribed in the first region.

The first region may be in any shape, for example, a square, or a circle, provided that it needs to be ensured that the first original region is inscribed in the first region.

1005. Extract the second region including the first region from the target image, scale down the second region to obtain a third region, and obtain a first target search region from a region except a region scaled down from the first original region in the third region.

In this embodiment of the present disclosure, after obtaining the first region, the image inpainting device may obtain the second region including the first region, and obtain a target search region from a region except the first original region in the second region. An area of the second region is greater than an area of the first region, and is smaller than an area of the target image.

The process of obtaining the target search region is similar to step 204, and the only difference is that a region range used when the target search region is obtained is switched from the second original region to the region except the first original region in the second region, that is, an intersection region between the second region and the second original region.

In a possible implementation, when obtaining the second region, the image inpainting device may obtain a boundary between the first region and another region than the first region, the boundary including a plurality of pixels; and form a boundary between the second region formed by the plurality of pixels that are located outside the boundary and have a distance to the plurality of pixels as a preset distance and the another region, to obtain a second region that includes the first region and has the area greater than the area of the first region. The preset distance may be 100, 500, or another distance. In addition, the preset distance may include a horizontal preset distance and a vertical preset distance.

Figure 11:
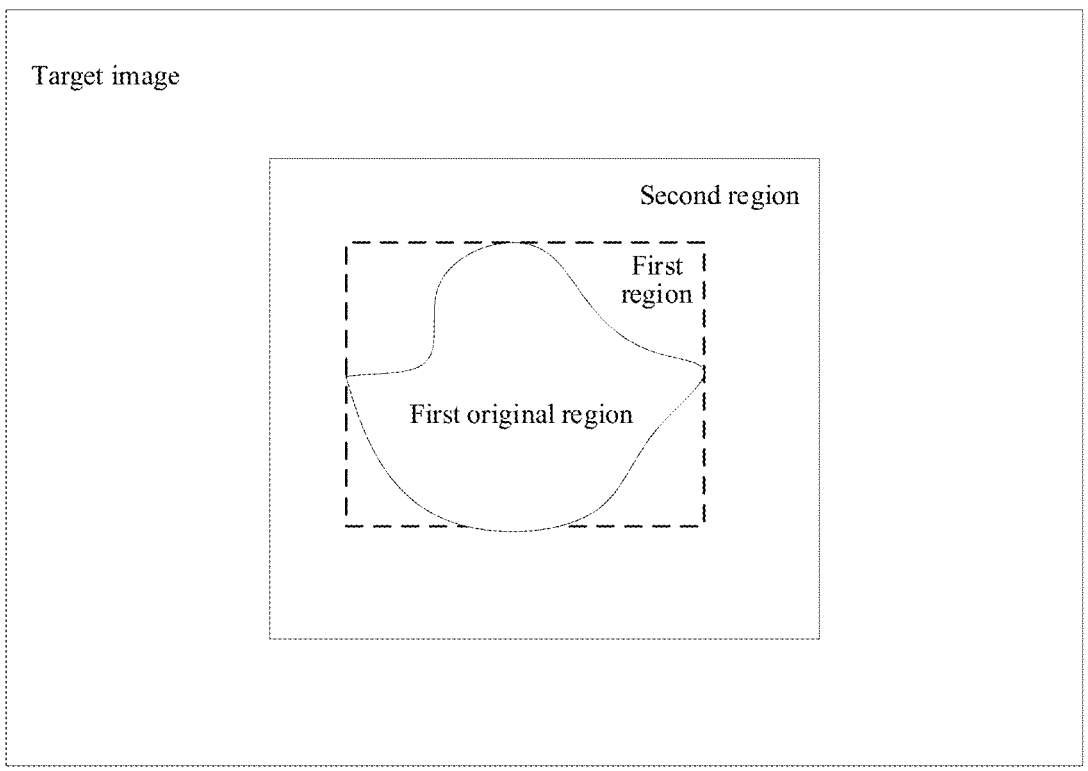
FIG. 11 is a schematic diagram of region division according to an embodiment of this application.

FIG. 11 is a schematic diagram of region division according to an embodiment of this application. Referring to FIG. 11, the image inpainting device obtains a circumscribed rectangular region of the first original region as the first region, and obtains a rectangular region with a relatively large size including the first region as the second region.

After obtaining the second region, the image inpainting device may perform the foregoing step 1005, and process only the second region subsequently by using a manner of extracting the second region and performing scaling down, without considering the another region than the second region in the target image again, so that the region area is reduced, and that the target search region is obtained in a region with a smaller area can shorten the search duration.

The process of obtaining the first target search region is similar to step 204, and the only difference is that a region range used when the target search region is obtained is switched from the second original region to a region except a region scaled down from the first original region in the third region.

1006. Search the first target search region for a first reference pixel block matching a pixel block scaled down from the target pixel block, and perform step 1007 or step 1008.

The process of searching the first target search region for the first reference pixel block is similar to step 205, and the only difference is that both the pixel block and the target search region reduce, and the found first reference pixel block is also a scaled-down pixel block.

1007. Inpaint, according to the first reference pixel block, the pixel block scaled down from the target pixel block; and scale up the inpainted third region, to obtain a fourth region having the same area as the second region, and replace the second region in the target image with the fourth region.

In this embodiment of this application, after the first reference pixel block is obtained, the pixel block scaled down from the target pixel block may be directly inpainted according to the first reference pixel block. The inpainting process is similar to step 206, and the only difference is that both the target pixel block and the reference pixel block related to the inpainting process are scaled-down pixel blocks. Details are not described herein again.

After the inpainting of the target pixel block is completed, an inpainted third region is obtained, and the third region is scaled up, to obtain a fourth region. An area of the fourth region is the same as the area of the second region in the target image, and the fourth region is an inpainted second region. After the second region is replaced with the fourth region, an inpainted target image is obtained.

1008. Obtain a second reference pixel block in the second region in the target image corresponding to the first reference pixel block, and inpaint the target pixel block according to the second reference pixel block.

In this embodiment of this application, after the first reference pixel block is obtained, the second reference pixel block in the second region in the target image corresponding to the first reference pixel block may be further obtained, and the target pixel block is inpainted according to the second reference pixel block. The inpainting process is similar to step 206. Details are not described herein again.

The first reference pixel block is a pixel block in the third region scaled from the second region, the second reference pixel block is a pixel block in the original second region, and a position of the first reference pixel block in the third region is the same as a position of the second reference pixel block in the second region.

In addition to the foregoing step 1005 to step 1008, the target search region may be further obtained from the region except the first original region in the second region by using another manner.

For example, the foregoing step 1005 to step 1008 may be replaced with the following step 1009:

1009. Obtain a circular region with the target pixel as a center, and determine an intersection region of the circular region, the second region, and the second original region as the target search region. The obtaining process includes the following steps: obtaining a circular region with the target pixel as a center and a search distance as a radius, the search distance being equal to a product of an area of the first original region and a preset coefficient, the preset coefficient being greater than 0.

When the circular region intersects with the intersection region between the second region and the second original region, an intersection region between the circular region and the intersection region between the second region and the second original region is determined as the target search region; or when the circular region does not intersect with the intersection region between the second region and the second original region, the search distance is expanded, a circular region with the target pixel as a center and the expanded search distance as a radius is obtained, until the currently obtained circular region intersects with the intersection region between the second region and the second original region, and an intersection region between the currently obtained circular region and the intersection region between the second region and the second original region as the target search region.

A manner of expanding the search distance is similar to the manner of expanding the search distance in step 2043.

In a possible implementation, the foregoing manners may be determined according to the area of the first original region for inpainting. If the size of the first original region is less than a first preset threshold, step 204 to step 206 are performed. When the size of the first original region is not less than the first preset threshold, but is less than a second preset threshold, step 1004 is performed, the second region is obtained after the first region is obtained, and step 1009 is performed based on the second region. When the size of the first original region is not less than the second preset threshold, step 1004 to step 1008 are performed.

The first preset threshold and the second preset threshold may be determined according to requirements on a calculation amount and requirements on the search accuracy.

Figure 12:
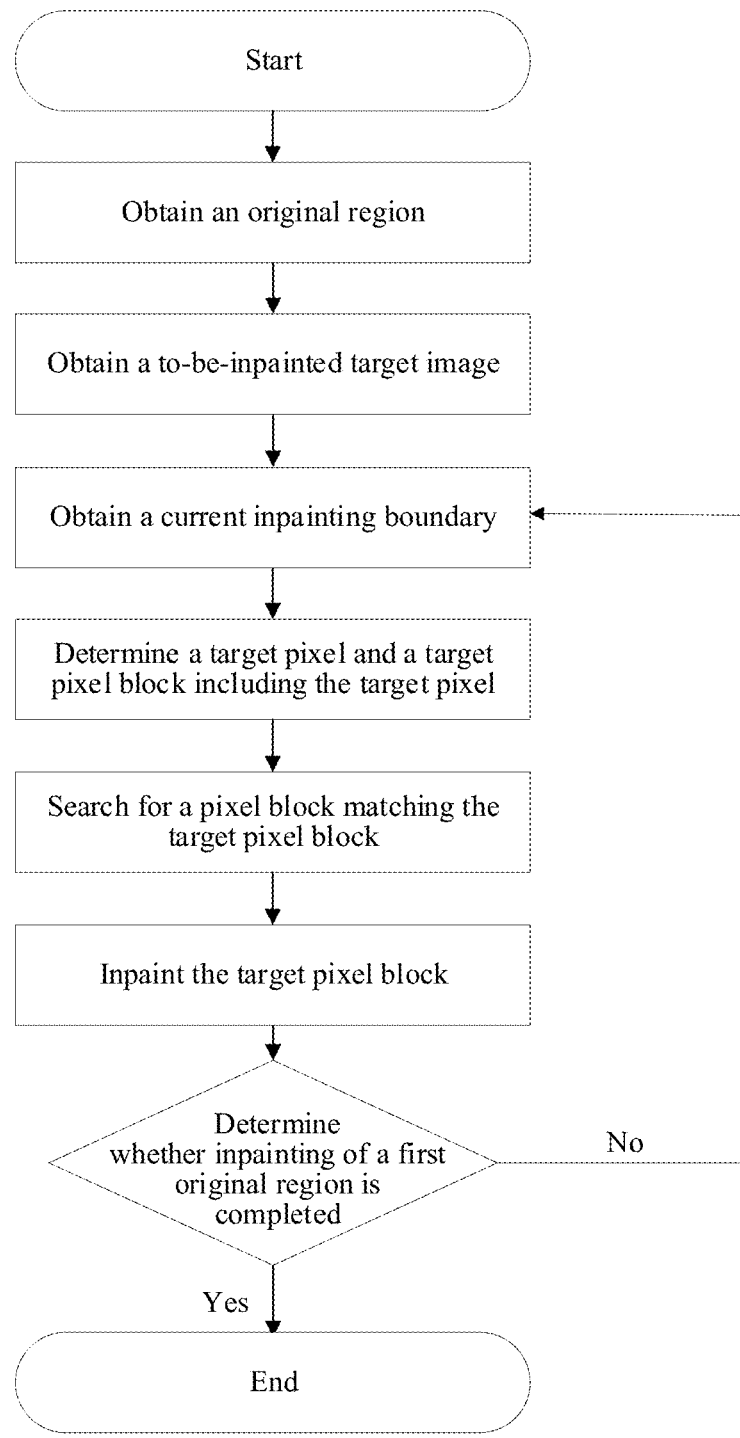
FIG. 12 is a schematic diagram of an operation process according to an embodiment of this application.

FIG. 12 is a schematic diagram of an operation process according to an embodiment of this application. Referring to FIG. 12, the operation process includes:

The image inpainting device obtains an original image inputted by the user. After a user intends to select an inpainting region in the original image, the image inpainting device obtains a to-be-inpainted target image and a current inpainting boundary in the target image, searches another region than the region for a pixel block matching the target pixel block after determining a target pixel on the inpainting boundary and a target pixel block including the target pixel, inpaints the target pixel block according to the matched pixel block, and then determines whether the inpainting of the first original region is completed. If the inpainting of the first original region is completed, the process is ended; and otherwise, the inpainting boundary is re-determined according to a changed to-be-inpainted region, and the foregoing step is re-performed according to a changed inpainting boundary, until the inpainting of the region selected by the user is completed.

In the method provided in the embodiments of this application, only the second region is processed subsequently by using a manner of extracting the second region, without considering the another region than the second region in the target image again, so that the region area is reduced, and that the target search region is obtained in a region with a smaller area shortens the search duration.

By obtaining a target search region with the target pixel as a center from the intersection region between the second region and the second original region, it can be not only ensured that the target search region includes image information in the original image, and the pixel block found in the target search region may be used for inpainting, but also can be ensured that the pixel block is searched near the target pixel block, thereby improving the accuracy, and improving the inpainting effect. Moreover, a region range used when the target search region is obtained is reduced, a search duration is shortened, and a search speed is improved.

Figure 13:
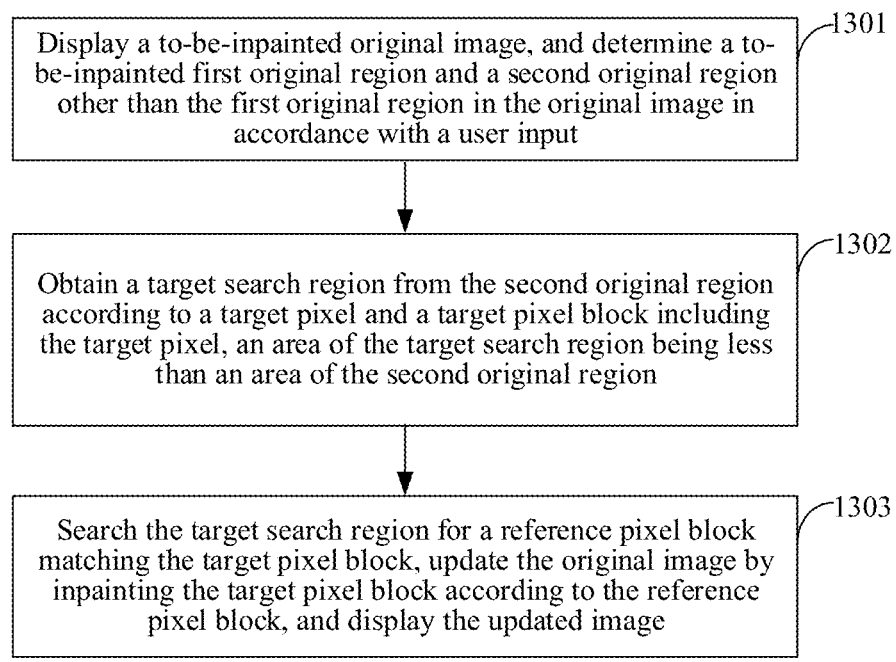
FIG. 13 is a flowchart of an image inpainting method according to an embodiment of this application.

Based on the foregoing embodiments, an image inpainting method is further provided. FIG. 13 is a flowchart of an image inpainting method according to an embodiment of this application. Referring to FIG. 13, the method includes the following steps:

1301. Display a to-be-inpainted original image, and determine a to-be-inpainted first original region and a second original region except the first original region in the original image, e.g., in accordance with a user input. For example, the user may designate the first original region by manually drawing on the original image.

In a possible implementation, when a selection operation in the original image according to the user input is detected, a region corresponding to the selection operation is determined as the first original region; and a region except the first original region in the original image is determined as the second original region.

1302. Obtain a target search region from the second original region according to a target pixel and a target pixel block including the target pixel by identifying the target pixel and the target pixel block comprising the target pixel in the first original region, an area of the target search region being smaller than an area of the second original region.

1303. Search the target search region for a reference pixel block matching the target pixel block, update the original image by inpainting the target pixel block according to the reference pixel block, and display the updated image.

In a possible implementation, during gradual enlargement of the region corresponding to the selection operation, a dynamic effect that each pixel in the region corresponding to the selection operation is switched from an original pixel value to a pixel value after inpainting is displayed, until the selection operation stops, while the operation of displaying the inpainted image is performed.

The embodiments of the foregoing step 1301 to 1303 are similar to the foregoing embodiments shown in FIG. 2.

In the image inpainting method provided in the embodiments of this application, a to-be-inpainted original image is displayed, and a to-be-inpainted first original region and a second original region except the first original region are determined in the original image; a target search region is obtained from the second original region; the target search region is searched for a reference pixel block matching the target pixel block; and the target pixel block is inpainted according to the reference pixel block. An area of the target search region is smaller than an area of the second original region. Compared with searching in the second original region, searching in a target search region with a relatively small area reduces the search region, shortens the search duration, and improves the search speed.

In addition, if the to-be-inpainted first original region is determined by detecting the selection operation in the original image, a user may set a region that needs to be inpainted provided that the selection operation is performed in the original region. The operation is easy and fast, and helps the user set flexibly.

In addition, a dynamic effect of the inpainting process is displayed in the process of selecting the region by the user, and a dynamic inpainting interface is displayed for the user, thereby improving the display effect, and enhancing interests.

In an embodiment, the inpainting the target pixel block according to the reference pixel block may be specifically: determining, for a first pixel in the target pixel block, a pixel value of a pixel in the reference pixel block corresponding to the first pixel as a pixel value after inpainting of the first pixel when the first pixel is located on a region that is not inpainted in the target pixel block; and fusing the pixel value of the pixel in the reference pixel block corresponding to the first pixel with the pixel value of the first pixel when the first pixel is located on another region than the region that is not inpainted in the target pixel block, and determining a pixel value obtained through the fusion as a pixel value after inpainting of the first pixel.

The fusion on the pixel value may be the weighted fusion. By setting weights of the target pixel block and the reference pixel block, the weighted fusion is performed on the pixel value of the pixel in the reference pixel block corresponding to the first pixel and the pixel value of the first pixel according to the weights of the pixel blocks. A sum of the weights of the target pixel block and the reference pixel block is 1. For example, the weights of the target pixel block and the reference pixel block are set to 0.4 and 0.6, or 0.65 and 0.35, or 0.5 and 0.5 respectively, or the weights of the target pixel block and the reference pixel block may be determined by using another manner.

In a specific embodiment, the pixel value of the pixel in the target pixel block may be calculated by using the following formula:

$$\Psi_{\hat{p}}(r) = \begin{cases} \psi_{\hat{q}}(s) & \forall r \in \psi_{\hat{p}} \cap T \\ \dfrac{\psi_{\hat{p}}(r) + \psi_{\hat{q}}(s)}{2} & \forall r \in \psi_{\hat{p}} \cap S \end{cases} \quad (8)$$

r is the pixel in the target pixel block, $\Psi_{\hat{p}}(r)$ s a pixel value after inpainting of the pixel r, and $\Psi_{\hat{p}}(r)$ is a pixel value before the inpainting of the pixel r; and s is a pixel in the reference pixel block corresponding to the pixel r, and $\Psi_{\hat{q}}(s)$ s a pixel value of the pixel s. $\Psi_{\hat{p}}$ is a region in which the target pixel block is located, T is a to-be-inpainted target image region, and $\forall r \in \psi_{\hat{p}} \cap T$ represents a pixel in the region that is not inpainted in the target pixel block; S is an original image region, and $\forall r \in \psi_{\hat{p}} \cap S$ represents a pixel located in the another region than the region that is not inpainted in the target pixel block.

In this way, after the target pixel block is inpainted, the target pixel block and a surrounding region are smoothly transited visually, thereby avoiding obvious artificial inpainting traces in the inpainting region.

Although the steps in the flowcharts of the embodiments are displayed sequentially according to instructions of arrows, these steps are not necessarily performed sequentially according to a sequence instructed by the arrows. Unless clearly stated herein, the steps are not performed strictly in the order, and the steps may be performed in other orders. In addition, at least a part of the steps in the foregoing embodiments may include a plurality of substeps or a plurality of stages. These substeps or stages are not necessarily performed and completed at the same moment, and may be performed at different moments. Besides, the substeps or stages may not be necessarily performed sequentially, and may be performed in turn or alternately with other steps or at least a part of substeps or stages of other steps.

Figure 14:
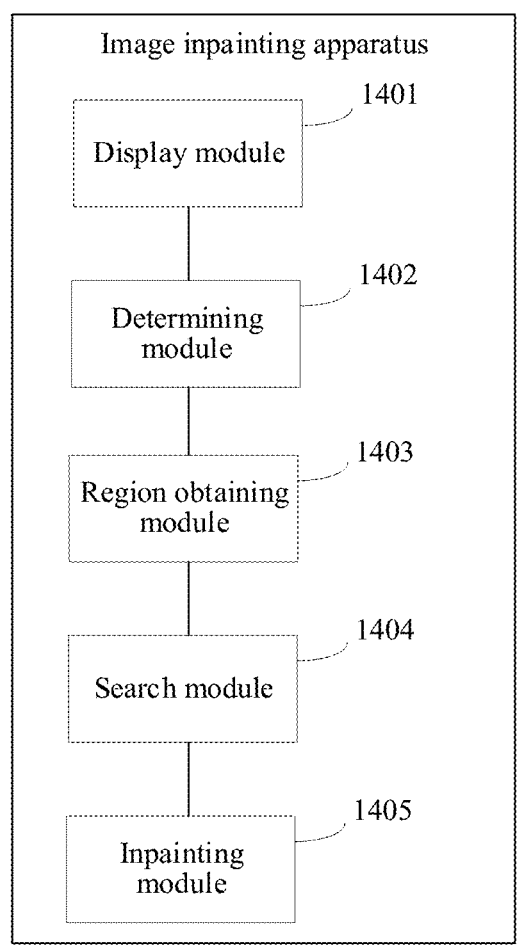
FIG. 14 is a schematic structural diagram of an image inpainting apparatus according to an embodiment of this application.

FIG. 14 is a schematic structural diagram of an image inpainting apparatus according to an embodiment of this application. Referring to FIG. 14, the apparatus includes: a display module 1401, a determining module 1402, a region obtaining module 1403, a search module 1404, and an inpainting module 1405. All or some of the modules included in the image inpainting apparatus may be implemented by software, hardware, or a combination thereof.

The display module 1401 is configured to display a to-be-inpainted original image.

The determining module 1402 is configured to determine a to-be-inpainted first original region and a second original region except the first original region in the original image.

The region obtaining module 1403 is configured to obtain a target search region from the second original region according to a target pixel and a target pixel block including the target pixel, an area of the target search region being smaller than an area of the second original region.

The search module 1404 is configured to search the target search region for a reference pixel block matching the target pixel block.

The inpainting module 1405 is configured to update the original image by inpainting the target pixel block according to the reference pixel block, and display the updated image.

In the image inpainting apparatus provided in the embodiments of this application, a to-be-inpainted original image is displayed, and a to-be-inpainted first original region and a second original region except the first original region are determined in the original image; a target search region is obtained from the second original region; the target search region is searched for a reference pixel block matching the target pixel block; and the target pixel block is inpainted according to the reference pixel block. An area of the target search region is smaller than an area of the second original region. Compared with searching in the second original region, searching in a target search region with a relatively small area reduces the search region, shortens the search duration, and improves the search speed.

In an embodiment, the determining module 1402 includes:
a first determining unit, configured to determine, when a selection operation in the original image is detected, a region corresponding to the selection operation as the first original region; and
a second determining unit, configured to determine a region except the first original region in the original image as the second original region.

In an embodiment, the image inpainting apparatus further includes:
a display module, configured to: display, during gradual enlargement of the region corresponding to the selection operation, a dynamic effect that each pixel in the region corresponding to the selection operation is switched from an original pixel value to a pixel value after inpainting, until the selection operation stops, while performing the operation of displaying the updated image.

In an embodiment, the region obtaining module 1403 includes:
a first region obtaining module, configured to: obtain a circular region with the target pixel as a center, and determine an intersection region between the circular region and the second original region as the target search region.

In an embodiment, the first region obtaining module includes:
a first obtaining subunit, configured to obtain a circular region with the target pixel as a center and a search distance as a radius;
a second obtaining subunit, configured to determine the intersection region between the circular region and the second original region as the target search region when the circular region intersects with the second original region; and
a third obtaining subunit, configured to: expand the search distance when the circular region does not intersect with the second original region, obtain a circular region with the target pixel as a center and the expanded search distance as a radius, until the currently obtained circular region intersects with the second original region, and determine an intersection region between the currently obtained circular region and the second original region as the target search region.

In an embodiment, the region obtaining module 1403 includes:
a second region obtaining unit, configured to: obtain a first region, obtain a second region, and obtain a target search region from a region except the first original region in the second region.

In an embodiment, the second region obtaining module includes:
a first obtaining subunit, configured to: obtain a second region, obtain a circular region with the target pixel as a center, and determine an intersection region of the circular region, the second region, and the second original region as the target search region.

In an embodiment, the second region obtaining module includes:
a second obtaining subunit, configured to: extract the second region from the target image, scale down the second region to obtain a third region, and obtain a first target search region from a region except a region scaled down from the first original region in the third region.

The search module 1404 is further configured to search the first target search region for a first reference pixel block matching a pixel block scaled down from the target pixel block.

The inpainting module 1405 includes a replacement unit or an inpainting unit.

The replacement unit is configured to: inpaint, according to the first reference pixel block, the pixel block scaled down from the target pixel block; and scale up the inpainted third region, to obtain a fourth region having the same area as the second region, and replace the second region in the target image with the fourth region.

The inpainting unit is configured to: obtain a second reference pixel block in the second region in the target image corresponding to the first reference pixel block, and inpaint the target pixel block according to the second reference pixel block.

In an embodiment, the search module 1404 includes:
a first pixel block obtaining unit, configured to obtain, from the target search region, a plurality of pixel blocks having the same size as the target pixel block; and
a search unit, configured to: obtain similarities between the plurality of pixel blocks and the target pixel block, and determine, in the plurality of pixel blocks, a pixel block with the highest similarity to the target pixel block as the reference pixel block.

In an embodiment, the search unit is further configured to: obtain Euclidean distances between the plurality of pixel blocks and the target pixel block; and
determine a pixel block with the minimum Euclidean distance to the target pixel block in the plurality of pixel blocks as the reference pixel block.

In an embodiment, the search module 1404 includes:
a second pixel block obtaining unit, configured to obtain, from the target search region, a plurality of pixel blocks matching the target pixel block; and
a fusion unit, configured to perform a weighted fusion on the plurality of pixel blocks according to a similarity between each of the plurality of pixel blocks and the target pixel block, to obtain the reference pixel block.

In an embodiment, the inpainting module 1405 further includes:
a determining unit, configured to determine, for a first pixel in the target pixel block, a pixel value of a pixel in the reference pixel block corresponding to the first pixel as a pixel value after inpainting of the first pixel; or
a fusion unit, configured to: fuse, for a first pixel in the target pixel block, a pixel value of a pixel in the reference pixel block corresponding to the first pixel with a pixel value of the first pixel, and determine a pixel value obtained through the fusion as a pixel value after inpainting of the first pixel.

Figure 15:
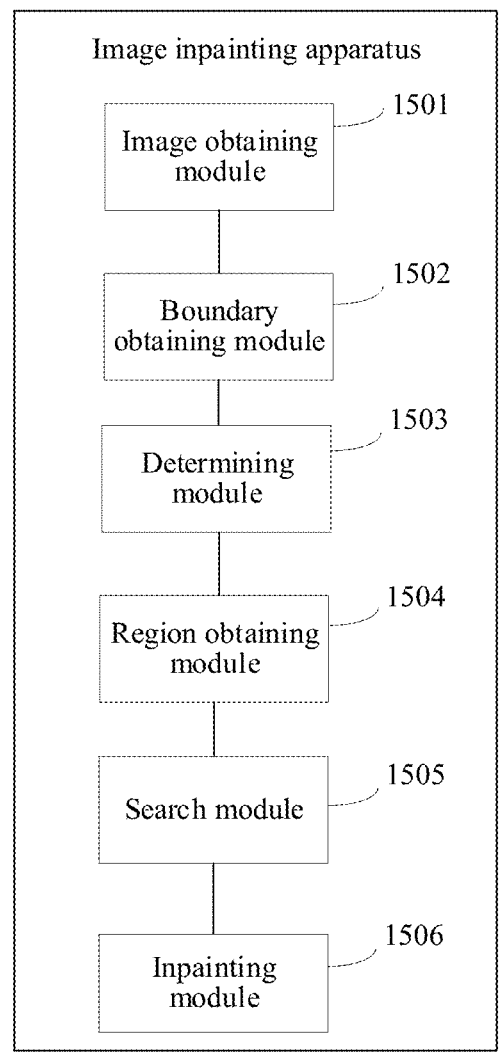
FIG. 15 is a schematic structural diagram of an image inpainting apparatus according to an embodiment of this application.

FIG. 15 is a schematic structural diagram of an image inpainting apparatus according to an embodiment of this application. Referring to FIG. 15, the apparatus includes: an image obtaining module 1501, a boundary obtaining module 1502, a determining module 1503, a region obtaining module 1504, a search module 1505, and an inpainting module 1506. All or some of the modules included in the image inpainting apparatus may be implemented by software, hardware, or a combination thereof.

The image obtaining module 1501 is configured to obtain a to-be-inpainted target image.

The boundary obtaining module 1502 is configured to obtain a current inpainting boundary.

The determining module 1503 is configured to determine a target pixel and a target pixel block.

The region obtaining module 1504 is configured to obtain a target search region from the second original region.

The search module 1505 is configured to search the target search region for a reference pixel block matching the target pixel block.

The inpainting module 1506 is configured to inpaint the target pixel block according to the reference pixel block.

In the apparatus provided in the embodiments of this application, a to-be-inpainted target image is obtained, the target image including a to-be-inpainted first original region and a second original region except the first original region; an inpainting boundary between a region that is not inpainted currently and another region than the region is obtained, and a target pixel on the inpainting boundary and a target pixel block including the target pixel are determined; a target search region is obtained from the second original region, and the target search region is searched for a reference pixel block matching the target pixel block; and the target pixel block is inpainted according to the reference pixel block. An area of the target search region is smaller than an area of the second original region. Compared with searching in the second original region, searching in a target search region with a relatively small area reduces the search region, shortens the search duration, and improves the search speed.

In an embodiment, the region obtaining module 1504 includes: a first region obtaining module, configured to: obtain a circular region with the target pixel as a center, and determine an intersection region between the circular region and the second original region as the target search region.

In an embodiment, the first region obtaining module includes:
a first obtaining subunit, configured to obtain a circular region with the target pixel as a center and a search distance as a radius;
a second obtaining subunit, configured to determine the intersection region between the circular region and the second original region as the target search region when the circular region intersects with the second original region; and
a third obtaining subunit, configured to: expand the search distance when the circular region does not intersect with the second original region, obtain a circular region with the target pixel as a center and the expanded search distance as a radius, until the currently obtained circular region intersects with the second original region, and determine an intersection region between the currently obtained circular region and the second original region as the target search region.

In an embodiment, the region obtaining module 1504 includes:
a second region obtaining unit, configured to: obtain a first region, obtain a second region, and obtain a target search region from a region except the first original region in the second region.

In an embodiment, the second region obtaining module includes:
a first obtaining subunit, configured to: obtain a second region, obtain a circular region with the target pixel as a center, and determine an intersection region of the circular region, the second region, and the second original region as the target search region.

In an embodiment, the second region obtaining module includes:
a second obtaining subunit, configured to: extract the second region from the target image, scale down the second region to obtain a third region, and obtain a first target search region from a region except a region scaled down from the first original region in the third region.

The search module 1505 is further configured to search the first target search region for a first reference pixel block matching a pixel block scaled down from the target pixel block.

The inpainting module 1506 includes a replacement unit or an inpainting unit.

The replacement unit is configured to: inpaint, according to the first reference pixel block, the pixel block scaled down from the target pixel block; and scale up the inpainted third region, to obtain a fourth region having the same area as the second region, and replace the second region in the target image with the fourth region.

The inpainting unit is configured to: obtain a second reference pixel block in the second region in the target image corresponding to the first reference pixel block, and inpaint the target pixel block according to the second reference pixel block.

In an embodiment, the search module 1505 includes:
- a first pixel block obtaining unit, configured to obtain, from the target search region, a plurality of pixel blocks having the same size as the target pixel block; and
- a search unit, configured to: obtain similarities between the plurality of pixel blocks and the target pixel block, and determine, in the plurality of pixel blocks, a pixel block with the highest similarity to the target pixel block as the reference pixel block.

In an embodiment, the search unit is further configured to:
- obtain Euclidean distances between the plurality of pixel blocks and the target pixel block; and
- determine a pixel block with the minimum Euclidean distance to the target pixel block in the plurality of pixel blocks as the reference pixel block.

In an embodiment, the search module 1505 includes:
- a second pixel block obtaining unit, configured to obtain, from the target search region, a plurality of pixel blocks matching the target pixel block; and
- a fusion unit, configured to perform a weighted fusion on the plurality of pixel blocks according to a similarity between each of the plurality of pixel blocks and the target pixel block, to obtain the reference pixel block.

In an embodiment, the inpainting module 1506 further includes:
- a determining unit, configured to determine, for a first pixel in the target pixel block, a pixel value of a pixel in the reference pixel block corresponding to the first pixel as a pixel value after inpainting of the first pixel; or
- a fusion unit, configured to: fuse, for a first pixel in the target pixel block, a pixel value of a pixel in the reference pixel block corresponding to the first pixel with a pixel value of the first pixel, and determine a pixel value obtained through the fusion as a pixel value after inpainting of the first pixel.

When the image inpainting apparatus provided in the foregoing embodiment inpaints the image, the division of the function modules is merely used as an example for description. In actual application, the functions may be distributed to and implemented by different function modules according to requirements. That is, an internal structure of the image inpainting apparatus is divided into different function modules, so as to complete all or some of the functions described above. In addition, the image inpainting apparatus and the image inpainting method embodiments provided in the foregoing embodiments belong to one conception. For a specific implementation process, refer to the method embodiments.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 16:
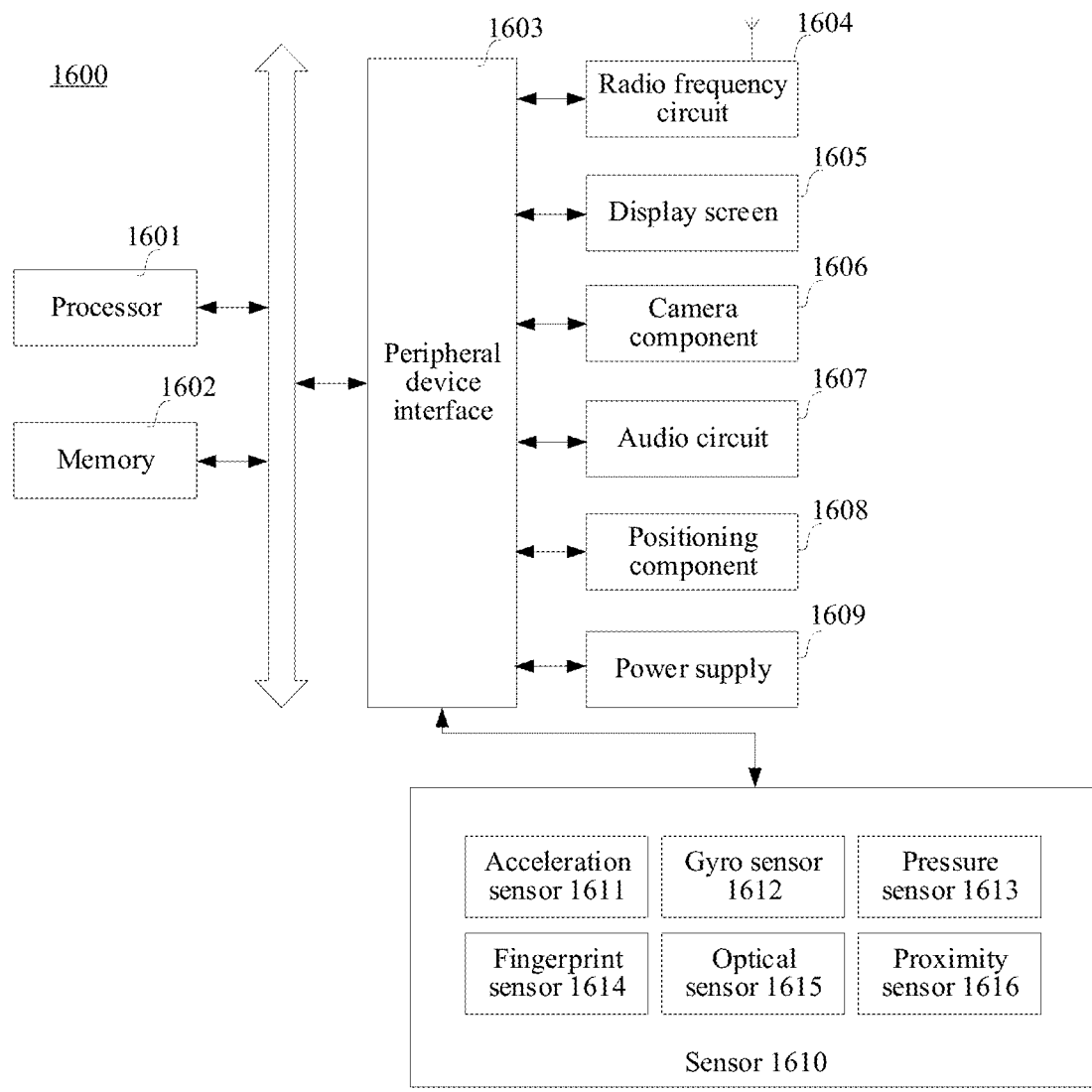
FIG. 16 is a schematic structural diagram of a terminal according to an embodiment of this application.

FIG. 16 is a schematic structural diagram of a terminal 1600 according to an embodiment of this application. The terminal 1600 may be a portable mobile terminal, for example: a smartphone, a tablet computer, a Moving Picture Experts Group Audio Layer III (MP3) player, a Moving Picture Experts Group Audio Layer IV (MP4) player, a notebook computer, a desktop computer, a head-mounted device, or any another smart terminal. The terminal 1600 may also be referred to as another name such as user equipment, a portable terminal, a laptop terminal, or a desktop terminal.

Generally, the terminal 1600 includes a processor 1601 and a memory 1602.

The processor 1601 may include one or more processing cores, for example, a 4-core processor or an 8-core processor. The processor 1601 may be implemented by using at least one hardware form of digital signal processing (DSP), a field programmable gate array (FPGA), and a programmable logic array (PLA). The processor 1601 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 1601 may be integrated with a graphics processing unit (GPU). The GPU is responsible for rendering and drawing content that a display needs to display. In some embodiments, the processor 1601 may further include an artificial intelligence (AI) processor. The AI processor is configured to process a computing operation related to machine learning.

The memory 1602 may include one or more computer-readable storage media. The computer-readable storage medium may be non-transient. The memory 1602 may further include a high-speed random access memory and a nonvolatile memory, for example, one or more disk storage devices or flash storage devices. In some embodiments, the non-transient computer-readable storage medium in the memory 1602 is configured to store at least one instruction, the at least one instruction being configured to be executed by the processor 1601 to implement the image inpainting method provided in the method embodiments of this application.

In some embodiments, the terminal 1600 may alternatively include: a peripheral device interface 1603 and at least one peripheral device. The processor 1601, the memory 1602 and the peripheral device interface 1603 may be connected by using a bus or a signal line. The peripheral devices may be connected to the peripheral device interface 1603 by using the bus, the signal line, or a circuit board. Specifically, the peripheral device includes at least one of a radio frequency circuit 1604, a touch display screen 1605, a camera component 1606, an audio circuit 1607, a positioning component 1608, and a power supply 1609.

The peripheral device interface 1603 may be configured to connect the at least one peripheral device related to input/output (I/O) to the processor 1601 and the memory 1602. In some embodiments, the processor 1601, the memory 1602, and the peripheral device interface 1603 are integrated on a same chip or circuit board. In some other embodiments, any one or two of the processor 1601, the memory 1602, and the peripheral device interface 1603 may be implemented on a separate chip or the circuit board. This is not limited in this embodiment.

The radio frequency circuit 1604 is configured to receive and transmit a radio frequency (RF) signal, also referred to as an electromagnetic signal. The RF circuit 1604 communicates with a communication network and another communication device by using the electromagnetic signal. The RF circuit 1604 converts an electric signal into an electromagnetic signal for transmission, or converts a received electromagnetic signal into an electric signal. In one embodiment, the radio frequency circuit 1604 includes an antenna system, an RF transceiver, one or more amplifiers, a tuner, an oscillator, a digital signal processor, a codec chip set, a subscriber identity module card, and the like. The RF circuit 1604 may communicate with another terminal by using at least one wireless communication protocol. The wireless communication protocol includes, but not limited to: a metropolitan area network, generations of mobile communication networks (2G, 3G, 4G, and 5G), a wireless local area network and/or a wireless fidelity (Wi-Fi) network. In some embodiments, the RF circuit 1604 may also include a circuit related to near field communication (NFC). This is not limited in this application.

The display screen 1605 is configured to display a user interface (UI). The UI may include a graph, text, an icon, a video, and any combination thereof. When the display screen 1605 is a touch display screen, the display screen 1605 is further capable of collecting touch signals on or above a surface of the display screen 1605. The touch signal may be used as a control signal to be inputted into the processor 1601 for processing. In this case, the display screen 1605 may be further configured to provide a virtual button and/or a virtual keyboard, which is also referred to as a soft button and/or a soft keyboard. In some embodiments, there may be one display screen 1605, disposed on a front panel of the terminal 1600. In some other embodiments, there may be two display screens 1605, respectively disposed on different surfaces of the terminal 1600 or designed in a foldable shape. In still some other embodiments, the display screen 1605 may be a flexible display screen, disposed on a curved surface or a folded surface of the terminal 1600. Even, the display screen 1605 may be further set in a non-rectangular irregular pattern, that is, a special-shaped screen. The display screen 1605 may be manufactured by using materials such as a liquid crystal display (LCD), an organic light-emitting diode (OLED), or the like.

The camera component 1606 is configured to collect an image or a video. In one embodiment, the camera component 1606 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, each being any one of a main camera, a depth of field camera, a wide-angle camera, and a telephotograph camera, to implement a Bokeh function through fusion of the main camera and the depth of field camera, panoramic photograph shooting and virtual reality (VR) shooting functions through fusion of the main camera and wide-angle camera, or another fusion shooting function. In some embodiments, the camera component 1606 may further include a flash. The flash may be a single color temperature flash, or may be a double color temperature flash. The double color temperature flash refers to a combination of a warm flash and a cold flash, and may be used for light compensation at different color temperatures.

The audio circuit 1607 may include a microphone and a speaker. The microphone is configured to collect sound waves of a user and an environment, and convert the sound waves into electrical signals and input the electrical signals into the processor 1601 for processing, or input the electrical signals into the RF circuit 1604 to implement speech communication. For stereo collection or noise reduction, there may be a plurality of microphones, disposed at different portions of the terminal 1600 respectively. The microphone may be further an array microphone or an omni-directional collection type microphone. The speaker is configured to convert electrical signals from the processor 1601 or the RF circuit 1604 into sound waves. The speaker may be a conventional film speaker, or may be a piezoelectric ceramic speaker. When the speaker is the piezoelectric ceramic speaker, the speaker can not only convert an electric signal into sound waves audible to a human being, but also convert an electric signal into sound waves inaudible to the human being for ranging and other purposes. In some embodiments, the audio circuit 1607 may further include an earphone jack.

The positioning component 1608 is configured to position a current geographic location of the terminal 1600, to implement a navigation or a location based service (LBS). The positioning component 1608 may be a positioning component based on the Global Positioning System (GPS) of the United States, the COMPASS System of China, the GLONASS System of Russia, or the GALILEO System of the European Union.

The power supply 1609 is configured to supply power to components in the terminal 1600. The power supply 1609 may be an alternating current, a direct current, a primary battery, or a rechargeable battery. When the power source 1609 includes the rechargeable battery, the rechargeable battery may be a wired rechargeable battery or a wireless rechargeable battery. The rechargeable battery may be further configured to support a quick charge technology.

In some embodiments, the terminal 1600 may further include one or more sensors 1610. The one or more sensors 1610 include, but not limited to: an acceleration sensor 1611, a gyro sensor 1612, a pressure sensor 1613, a fingerprint sensor 1614, an optical sensor 1615, and a proximity sensor 1616.

The acceleration sensor 1611 may detect the magnitude of acceleration on three coordinate axes of a coordinate system established with the terminal 1600. For example, the acceleration sensor 1611 may be configured to detect components of gravity acceleration on the three coordinate axes. The processor 1601 may control, according to a gravity acceleration signal collected by the acceleration sensor 1611, the touch display screen 1605 to display the user interface in a frame view or a longitudinal view. The acceleration sensor 1611 may be further configured to collect game or user motion data.

The gyro sensor 1612 may detect a body direction and a rotation angle of the terminal 1600. The gyro sensor 1612 may cooperate with the acceleration sensor 1611 to collect a 3D action by the user on the terminal 1600. The processor 1601 may implement the following functions according to the data collected by the gyro sensor 1612: motion sensing (such as changing the UI according to a tilt operation of the user), image stabilization at shooting, game control, and inertial navigation.

The pressure sensor 1613 may be disposed at a side frame of the terminal 1600 and/or a lower layer of the touch display 1605. When the pressure sensor 1613 is disposed at the side frame of the terminal 1600, a holding signal of the user on the terminal 1600 may be detected, and the processor 1601 performs left/right hand recognition or a quick operation according to the holding signal collected by the pressure sensor 1613. When the pressure sensor 1613 is disposed on the lower layer of the touch display screen 1605, the processor 1601 controls an operable control on the UI interface according to a pressure operation of the user on the touch display screen 1605. The operable control includes at least one of a button control, a scroll-bar control, an icon control and a menu control.

The fingerprint sensor 1614 is configured to collect a fingerprint of the user, and the processor 1601 identifies an identity of the user according to the fingerprint collected by the fingerprint sensor 1614, or the fingerprint sensor 1614 identifies an identity of the user according to the collected fingerprint. When the identity of the user is identified as a trusted identity, the processor 1601 authorizes the user to perform a related sensitive operation. The sensitive operation includes unlocking a screen, viewing encrypted information, downloading software, payment, changing settings, and the like. The fingerprint sensor 1614 may be disposed on a front surface, a back surface, or a side surface of the terminal 1600. When the terminal 1600 is provided with a physical button or a vendor logo, the fingerprint sensor 1614 may be integrated with the physical button or the vendor logo.

The optical sensor 1615 is configured to collect ambient light intensity. In an embodiment, the processor 1601 may control the display brightness of the touch display screen 1605 according to the ambient light intensity collected by the optical sensor 1615. Specifically, when the ambient light intensity is relatively high, the display brightness of the touch display screen 1605 is increased. When the ambient light intensity is relatively low, the display brightness of the touch display screen 1605 is reduced. In another embodiment, the processor 1601 may further dynamically adjust a camera parameter of the camera component 1606 according to the ambient light intensity collected by the optical sensor 1615.

The proximity sensor 1616, also referred to as a distance sensor, is generally disposed on a front panel of the terminal 1600. The proximity sensor 1616 is configured to collect a distance between the user and the front surface of the terminal 1600. In an embodiment, when the proximity sensor 1616 detects that the distance between the user and the front surface of the terminal 1600 gradually becomes smaller, the touch display screen 1605 is controlled by the processor 1601 to switch from a screen-on state to a screen-off state. In a case that the proximity sensor 1616 detects that the distance between the user and the front surface of the terminal 1600 gradually becomes larger, the touch display screen 1605 is controlled by the processor 1601 to switch from the screen-off state to the screen-on state.

A person skilled in the art may understand that the structure shown in FIG. 16 does not constitute a limitation on the terminal 1600, and the terminal may include more or fewer components than those shown in the figure, or some components may be combined, or a different component deployment may be used.

Figure 17:
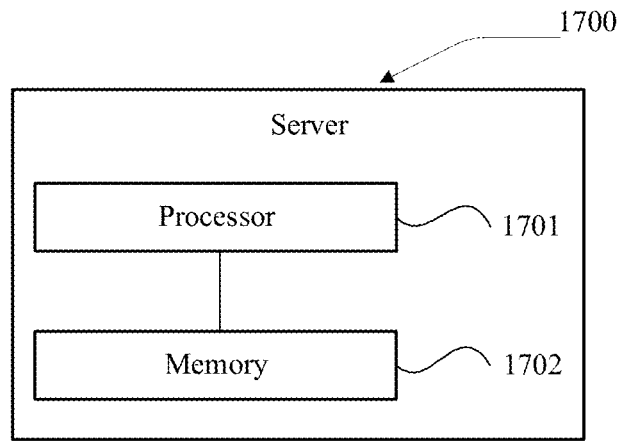
FIG. 17 is a structural block diagram of a server according to an embodiment of this application.

FIG. 17 is a schematic structural diagram of a server according to an embodiment of this application. The server 1700 may vary greatly due to different configurations or performance, and may include one or more central processing units (CPUs) 1701 and one or more memories 1702. The memory 1702 stores at least one instruction, the at least one instruction being loaded and executed by the processor 1701 to implement the methods provided in the foregoing method embodiments. Certainly, the server may further include components such as a wired or wireless network interface, a keyboard, and an input/output interface, to facilitate inputs/outputs. The server may further include another component configured to implement functions of a device. Details are not described herein again.

The server 1700 may be configured to perform the steps performed by the image inpainting device in the foregoing image inpainting method.

A device for inpainting an image is further provided in the embodiments of this application. The device may be specifically the terminal or the server in the foregoing embodiments. The device includes a processor and a memory, the memory storing computer-readable instructions, the computer-readable instructions, when executed by the processor, causing the processor to perform the operations of the foregoing image inpainting method. The steps in the image inpainting method may be the steps in the image inpainting method in the foregoing embodiments.

The embodiments of this application further provide a computer-readable storage medium, the computer-readable storage medium storing computer-readable instructions, the computer-readable instructions, when executed by a processor, causing a processor to perform the steps in the foregoing image inpainting method. The steps in the image inpainting method may be the steps in the image inpainting method in the foregoing embodiments.

A person of ordinary skill in the art may understand that all or some of the procedures of the method in the foregoing embodiments may be implemented by using a computer program instructing relevant hardware. The program may be stored in a non-volatile computer-readable storage medium. When the program is executed, the procedures of the foregoing method embodiments may be included. Any reference to a memory, a storage, a database, or another medium used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), a flash memory, or the like. The volatile memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a Rambus direct RAM (RDRAM), a direct Rambus dynamic RAM (DRDRAM), and a Rambus dynamic RAM (RDRAM).

The technical features in the foregoing embodiments may be combined in different manners. For concise description, not all possible combinations of the technical features in the embodiments are described. However, provided that combinations of the technical features do not conflict with each other, the combinations of the technical features are considered as falling within the scope described in this specification.

The foregoing embodiments only describe several implementations of this application, which are described specifically and in detail, and therefore cannot be construed as a limitation to the patent scope of the present disclosure. A person of ordinary skill in the art may make variations and improvements without departing from the ideas of this application, which all fall within the protection scope of this application. Therefore, the protection scope of the patent of this application is to be subject to the appended claims.

What is claimed is:

1. An image inpainting method, performed by a computing device, the method comprising:

displaying an original image;

determining a to-be-inpainted first original region and a second original region different from the first original region in the original image in accordance with a user input;

identifying a target pixel and a target pixel block comprising the target pixel in the first original region;

obtaining a target search region from the second original region according to the target pixel and the target pixel block comprising the target pixel, an area of the target search region being smaller than an area of the second original region;

dividing the target pixel block along a boundary into a first region and a second region;

in accordance with a determination that a first pixel is located in the first region having a larger intersection area with a region that is not inpainted, setting the pixel value of a pixel in a reference pixel block corresponding to the first pixel as the pixel value of the first pixel after inpainting; and in accordance with a determination that the first pixel is located in the second region, fusing the pixel value of the first pixel with the pixel value of the pixel in the reference pixel block corresponding to the first pixel as the pixel value of the first pixel after inpainting; and searching the target search region for a reference pixel block matching the target pixel block and updating the original image by inpainting the target pixel block according to the reference pixel block, and displaying the updated image.

2. The method according to claim 1, wherein the determining a to-be-inpainted first original region and a second original region different from the first original region in the original image comprises:

determining, when a selection operation in the original image according to the user input is detected, a region corresponding to the selection operation as the first original region; and determining a region different from the first original region in the original image as the second original region.

3. The method according to claim 2, further comprising:

displaying, during gradual enlargement of the region corresponding to the selection operation, a dynamic effect that each pixel in the region corresponding to the selection operation is switched from an original pixel value to a pixel value after inpainting, until the selection operation stops, while performing the operation of displaying the updated image.

4. The method according to claim 1, wherein the determining a to-be-inpainted first original region and a second original region different from the first original region in the original image comprises:

determining, when a selection operation in the original image according to the user input is detected, a region corresponding to the selection operation;

creating a labeled image according to the region corresponding to the selection operation, a size of the labeled image being equal to a size of the original image;

obtaining a boundary between the region corresponding to the selection operation and an unselected region in the labeled image; and performing region division on the original image according to a position of the boundary, and determining the first original region and the second original region in the original image.

5. The method according to claim 1, wherein the obtaining a target search region from the second original region comprises:

obtaining a circular region with the target pixel as a center, and determining an intersection region between the circular region and the second original region as the target search region.

6. The method according to claim 5, wherein the obtaining a circular region with the target pixel as a center, and determining an intersection region between the circular region and the second original region as the target search region comprises:

obtaining a circular region with the target pixel as a center and a search distance as a radius, the search distance being equal to a product of an area of the first original region and a preset coefficient, the preset coefficient being greater than 0; and determining the intersection region between the circular region and the second original region as the target search region when the circular region intersects with the second original region; or expanding the search distance when the circular region does not intersect with the second original region, obtaining a circular region with the target pixel as a center and the expanded search distance as a radius, until the currently obtained circular region intersects with the second original region, and determining an intersection region between the currently obtained circular region and the second original region as the target search region.

7. The method according to claim 1, wherein the obtaining a target search region from the second original region comprises:

obtaining a first region, the first region comprising the first original region, and the first original region being inscribed in the first region;

obtaining a second region, the second region comprising the first region, an area of the second region being smaller than an area of the target image; and obtaining the target search region from a region except the first original region in the second region.

8. The method according to claim 7, wherein the obtaining the target search region from a region except the first original region in the second region comprises:

obtaining a circular region with the target pixel as a center, and determining an intersection region of the circular region, the second region, and the second original region as the target search region.

9. The method according to claim 8, wherein the obtaining a circular region with the target pixel as a center, and determining an intersection region of the circular region, the second region, and the second original region as the target search region comprises:

obtaining a circular region with the target pixel as a center and a search distance as a radius, the search distance being equal to a product of an area of the first original region and a preset coefficient; and determining, when the circular region intersects with a first intersection region, an intersection region between the circular region and the first intersection region as the target search region, the first intersection region being an intersection region between the second region and the second original region; or expanding the search distance when the circular region does not intersect with the first intersection region, obtaining a circular region with the target pixel as a center and the expanded search distance as a radius, until the currently obtained circular region intersects with the first intersection region, and determining an intersection region between the currently obtained circular region and the first intersection region as the target search region.

10. The method according to claim 7, wherein the obtaining the target search region from a region except the first original region in the second region comprises:
extracting the second region from the target image, scaling down the second region to obtain a third region, and obtaining a first target search region from a region except a region scaled down from the first original region in the third region;
the searching the target search region for a reference pixel block matching the target pixel block, and inpainting the target pixel block according to the reference pixel block comprises;
searching the first target search region for a first reference pixel block matching a pixel block scaled down from the target pixel block; and
inpainting, according to the first reference pixel block, the pixel block scaled down from the target pixel block; and scaling up the inpainted third region, to obtain a fourth region having the same area as the second region, and replacing the second region in the target image with the fourth region; or
obtaining a second reference pixel block in the second region in the target image corresponding to the first reference pixel block, and inpainting the target pixel block according to the second reference pixel block.

11. The method according to claim 1, wherein the searching the target search region for a reference pixel block matching the target pixel block comprises:
obtaining, from the target search region, a plurality of pixel blocks having the same size as the target pixel block; and
obtaining similarities between the plurality of pixel blocks and the target pixel block, and determining, in the plurality of pixel blocks, a pixel block with the highest similarity to the target pixel block as the reference pixel block.

12. The method according to claim 1, wherein the searching the target search region for a reference pixel block matching the target pixel block comprises:
obtaining, from the target search region, a plurality of pixel blocks matching the target pixel block; and
performing a weighted fusion on the plurality of pixel blocks according to a similarity between each of the plurality of pixel blocks and the target pixel block, to obtain the reference pixel block.

13. The method according to claim 1, wherein the inpainting the target pixel block according to the reference pixel block comprises:
determining, for a first pixel in the target pixel block, a pixel value of a pixel in the reference pixel block corresponding to the first pixel as a pixel value after inpainting of the first pixel; or
fusing, for a first pixel in the target pixel block, a pixel value of a pixel in the reference pixel block corresponding to the first pixel with a pixel value of the first pixel, and determining a pixel value obtained through the fusion as a pixel value after inpainting of the first pixel.

14. A computing device, comprising a memory and a processor, the memory storing computer-readable instructions that, when executed by the processor, cause the computing device to perform a plurality of operations including:
displaying an original image;
determining a to-be-inpainted first original region and a second original region different from the first original region in the original image in accordance with a user input;
identifying a target pixel and a target pixel block comprising the target pixel in the first original region;
obtaining a target search region from the second original region according to the target pixel and the target pixel block comprising the target pixel, an area of the target search region being smaller than an area of the second original region;
dividing the target pixel block along a boundary into a first region and a second region;
in accordance with a determination that a first pixel is located in the first region having a larger intersection area with a region that is not inpainted, setting the pixel value of a pixel in a reference pixel block corresponding to the first pixel as the pixel value of the first pixel after inpainting; and
in accordance with a determination that the first pixel is located in the second region, fusing the pixel value of the first pixel with the pixel value of the pixel in the reference pixel block corresponding to the first pixel as the pixel value of the first pixel after inpainting; and
searching the target search region for a reference pixel block matching the target pixel block and updating the original image by inpainting the target pixel block according to the reference pixel block, and displaying the updated image.

15. The computing device according to claim 14, wherein the determining a to-be-inpainted first original region and a second original region different from the first original region in the original image comprises:
determining, when a selection operation in the original image according to the user input is detected, a region corresponding to the selection operation as the first original region; and
determining a region different from the first original region in the original image as the second original region.

16. The computing device according to claim 14, wherein the determining a to-be-inpainted first original region and a second original region different from the first original region in the original image comprises:
determining, when a selection operation in the original image according to the user input is detected, a region corresponding to the selection operation;
creating a labeled image according to the region corresponding to the selection operation, a size of the labeled image being equal to a size of the original image;
obtaining a boundary between the region corresponding to the selection operation and an unselected region in the labeled image; and
performing region division on the original image according to a position of the boundary, and determining the first original region and the second original region in the original image.

17. The computing device according to claim 14, wherein the obtaining a target search region from the second original region comprises:
obtaining a circular region with the target pixel as a center, and determining an intersection region between the circular region and the second original region as the target search region.

18. The computing device according to claim 14, wherein the obtaining a target search region from the second original region comprises:

obtaining a first region, the first region comprising the first original region, and the first original region being inscribed in the first region;

obtaining a second region, the second region comprising the first region, an area of the second region being smaller than an area of the target image; and obtaining the target search region from a region except the first original region in the second region.

19. The computing device according to claim 14, wherein the inpainting the target pixel block according to the reference pixel block comprises:

determining, for a first pixel in the target pixel block, a pixel value of a pixel in the reference pixel block corresponding to the first pixel as a pixel value after inpainting of the first pixel; or fusing, for a first pixel in the target pixel block, a pixel value of a pixel in the reference pixel block corresponding to the first pixel with a pixel value of the first pixel, and determining a pixel value obtained through the fusion as a pixel value after inpainting of the first pixel.

20. A non-transitory computer-readable storage medium storing computer-readable instructions that, when executed by one or more processors of a computing device, cause the computing device to perform a plurality of operations including:

displaying an original image;

determining a to-be-inpainted first original region and a second original region different from the first original region in the original image in accordance with a user input;

identifying a target pixel and a target pixel block comprising the target pixel in the first original region;

obtaining a target search region from the second original region according to the target pixel and the target pixel block comprising the target pixel, an area of the target search region being smaller than an area of the second original region;

dividing the target pixel block along a boundary into a first region and a second region;

in accordance with a determination that a first pixel is located in the first region having a larger intersection area with a region that is not inpainted, setting the pixel value of a pixel in a reference pixel block corresponding to the first pixel as the pixel value of the first pixel after inpainting; and in accordance with a determination that the first pixel is located in the second region, fusing the pixel value of the first pixel with the pixel value of the pixel in the reference pixel block corresponding to the first pixel as the pixel value of the first pixel after inpainting; and searching the target search region for a reference pixel block matching the target pixel block and updating the original image by inpainting the target pixel block according to the reference pixel block, and displaying the updated image.

* * * * *